US009982076B2

(12) United States Patent
Ye et al.

(10) Patent No.: US 9,982,076 B2
(45) Date of Patent: May 29, 2018

(54) SUPPORTED BIS PHENOLATE TRANSITION METALS COMPLEXES, PRODUCTION AND USE THEREOF

(71) Applicant: ExxonMobil Chemical Patents Inc., Baytown, TX (US)

(72) Inventors: Xuan Ye, Houston, TX (US); Crisita Carmen H. Atienza, Houston, TX (US); Matthew W. Holtcamp, Huffman, TX (US); David F. Sanders, Houston, TX (US); Gregory S. Day, College Station, TX (US); Michelle E. Titone, Houston, TX (US); David A. Cano, Houston, TX (US); Matthew S. Bedoya, Humble, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days. days.

(21) Appl. No.: 15/242,357

(22) Filed: Aug. 19, 2016

(65) Prior Publication Data

US 2017/0096510 A1 Apr. 6, 2017

Related U.S. Application Data

(60) Provisional application No. 62/236,697, filed on Oct. 2, 2015.

(51) Int. Cl.
*C08F 4/76* (2006.01)
*C08F 4/64* (2006.01)
*C08F 210/16* (2006.01)
*C08F 4/60* (2006.01)

(52) U.S. Cl.
CPC ........ *C08F 210/16* (2013.01); *C08F 4/64189* (2013.01); *C08F 4/60189* (2013.01); *C08F 4/64* (2013.01)

(58) Field of Classification Search
CPC ................ C08F 4/60189; C08F 4/64189
See application file for complete search history.

(56) References Cited

U.S. PATENT DOCUMENTS

| | | | |
|---|---|---|---|
| 5,308,811 A | 5/1994 | Suga et al. | |
| 5,830,820 A | 11/1998 | Yano et al. | |
| 5,928,982 A | 7/1999 | Suga et al. | |
| 5,973,084 A | 10/1999 | Suga et al. | |
| 6,103,657 A | 8/2000 | Murray | |
| 6,274,684 B1 | 8/2001 | Loveday et al. | |
| 6,333,423 B1 * | 12/2001 | Kol ......................... | C07F 7/006 502/150 |
| 6,368,999 B1 | 4/2002 | Speca | |
| 6,399,535 B1 | 6/2002 | Shih et al. | |
| 6,531,552 B2 | 3/2003 | Nakano et al. | |
| 6,559,090 B1 | 5/2003 | Shih et al. | |
| 6,596,827 B2 * | 7/2003 | Kol ......................... | C07F 7/006 502/103 |
| 6,664,348 B2 | 12/2003 | Speca | |
| 6,734,131 B2 | 5/2004 | Shih et al. | |
| 6,844,389 B2 | 1/2005 | Mehta et al. | |
| 6,900,321 B2 | 5/2005 | Boussie et al. | |
| 6,943,224 B2 | 9/2005 | Shih | |
| 7,183,348 B2 | 2/2007 | Reinking et al. | |
| 7,220,695 B2 | 5/2007 | Casty et al. | |
| 7,355,058 B2 | 4/2008 | Luo et al. | |
| 7,754,840 B2 | 7/2010 | Loveday et al. | |
| 7,973,116 B2 | 7/2011 | Hagadorn et al. | |
| 8,071,701 B2 | 12/2011 | Klosin et al. | |
| 8,080,613 B2 | 12/2011 | Moad et al. | |
| 8,110,518 B2 | 2/2012 | Marin et al. | |
| 8,575,284 B2 | 11/2013 | Luo et al. | |
| 8,791,217 B2 | 7/2014 | Hlavinka et al. | |
| 8,907,032 B2 | 12/2014 | Kol et al. | |
| 8,937,137 B2 | 1/2015 | Holtcamp et al. | |
| 8,952,114 B2 | 2/2015 | Giesbrecht et al. | |
| 8,957,171 B2 | 2/2015 | Giesbrecht et al. | |
| 8,957,172 B2 | 2/2015 | Giesbrecht et al. | |
| 9,079,991 B2 | 7/2015 | Ker et al. | |
| 9,120,879 B2 | 9/2015 | Giesbrecht et al. | |
| 9,150,676 B2 | 10/2015 | Kol et al. | |
| 9,193,813 B2 | 11/2015 | Kol et al. | |
| 9,200,099 B2 | 12/2015 | Kol et al. | |
| 9,200,100 B2 | 12/2015 | Kol et al. | |
| 9,290,589 B2 | 3/2016 | Evans et al. | |
| 2002/0019503 A1 | 2/2002 | Kol et al. | |
| 2002/0123582 A1 | 9/2002 | Speca | |
| 2002/0142912 A1 | 10/2002 | Boussie et al. | |
| 2003/0027950 A1 | 2/2003 | Uchino et al. | |
| 2003/0096698 A1 | 5/2003 | Shih et al. | |

(Continued)

FOREIGN PATENT DOCUMENTS

| | | |
|---|---|---|
| EP | 511665 A1 | 11/1992 |
| EP | 1 160 261 A1 | 12/2001 |
| EP | 0 849 292 B1 | 8/2002 |
| JP | 1995033814 A | 2/1995 |
| JP | 2011089019 A | 5/2011 |
| JP | 2013124302 A | 6/2013 |
| WO | 97/48743 A1 | 12/1997 |
| WO | 01/42320 A1 | 6/2001 |
| WO | 02/088198 A1 | 11/2002 |
| WO | 2004/106390 A2 | 12/2004 |

(Continued)

OTHER PUBLICATIONS

U.S. Appl. No. 15/051,421, filed Feb. 23, 2015, Crisita C.H. Atienza et al.
U.S. Appl. No. 62/149,799, filed Apr. 20, 2015, Xuan Ye et al.
U.S. Appl. No. 62/149,814, filed Apr. 20, 2015, Xuan Ye et al.
U.S. Appl. No. 62/236,691, filed Oct. 2, 2015, Xuan Ye et al.
U.S. Appl. No. 62/236,727, filed Oct. 2, 2015, Xuan Ye et al.

(Continued)

*Primary Examiner* — Rip A Lee

(57) ABSTRACT

A catalyst system including the reaction product of a fluorided support, an activator, and at least a first transition metal catalyst compound; methods of making such catalyst systems, polymerization processes using such catalyst systems, and polymers made therefrom.

45 Claims, No Drawings

(56) References Cited

U.S. PATENT DOCUMENTS

| | | | |
|---|---|---|---|
| 2005/0148743 | A1 | 7/2005 | Casty et al. |
| 2006/0293470 | A1 | 12/2006 | Cao et al. |
| 2010/0227990 | A1 | 9/2010 | Kuhlman et al. |
| 2012/0027017 | A1 | 2/2012 | Rai et al. |
| 2013/0035463 | A1 | 2/2013 | Cann et al. |
| 2013/0131294 | A1 | 5/2013 | Hagadorn et al. |
| 2013/0172498 | A1 | 7/2013 | Hlavinka et al. |
| 2014/0031504 | A1 | 1/2014 | Jacobsen et al. |
| 2014/0039137 | A1 | 2/2014 | Giesbrecht et al. |
| 2014/0039138 | A1 | 2/2014 | Giesbrecht et al. |
| 2014/0039139 | A1 | 2/2014 | Giesbrecht et al. |
| 2014/0121341 | A1 | 5/2014 | Holtcamp et al. |
| 2014/0128557 | A1 | 5/2014 | Giesbrecht et al. |
| 2014/0221587 | A1 | 8/2014 | Hagedorn et al. |
| 2014/0275454 | A1 | 9/2014 | Holtcamp et al. |
| 2015/0141601 | A1 | 5/2015 | Hagadorn et al. |
| 2015/0329652 | A1 | 11/2015 | Hlavinka |
| 2017/0088641 | A1 | 3/2017 | Holtcamp et al. |
| 2017/0096506 | A1 | 4/2017 | Ye et al. |
| 2017/0096507 | A1 | 4/2017 | Atienza et al. |
| 2017/0096508 | A1 | 4/2017 | Ye et al. |
| 2017/0096509 | A1 | 4/2017 | Atienza et al. |
| 2017/0096511 | A1 | 4/2017 | Atienza et al. |

FOREIGN PATENT DOCUMENTS

| | | |
|---|---|---|
| WO | 2005/075525 | 8/2005 |
| WO | 2006/036748 A2 | 4/2006 |
| WO | 2007/018804 A1 | 2/2007 |
| WO | 2012/033670 A1 | 3/2012 |
| WO | 2012/098521 A1 | 7/2012 |
| WO | 2012/134614 A1 | 10/2012 |
| WO | 2012/134615 A1 | 10/2012 |
| WO | 2012/158260 A1 | 11/2012 |
| WO | 2013/028283 A1 | 2/2013 |
| WO | 2013/040276 A1 | 3/2013 |
| WO | 2014/043202 A1 | 9/2014 |
| WO | 2014/149361 A1 | 9/2014 |
| WO | 2015/088819 A1 | 6/2015 |
| WO | 2017/039994 | 3/2017 |
| WO | 2017/039995 | 3/2017 |

OTHER PUBLICATIONS

Barroso et al., "*Chiral Diamine Bis(phenolate) Ti$^{IV}$ and ZR$^{IV}$ Complexes—Synthesis, Structures and Reactivity*," European Journal of Inorganic Chemistry, 2011, pp. 4277-4290.

Gibson et al, "*Advances in Non-Metallocene Olefin Polymerization Catalysis*," Chemical Review, 2003, vol. 103, pp. 283-315.

Groysman et al., "*Diverse Structure-Activity Trends in Amine Bis(phenolate) Titanium Polymerization Catalysts*," Organometallics, 2004, vol. 23, pp. 5291-5299.

Groysman et al. "*From THF to Furan: Activity Tuning and Mechanistic Insight via Sidearm Donor Replacement in Group IV Amine Bis(phenolate) Polymerization Catalyst*," Organometallics, 2003, vol. 22, pp. 3013-3015.

Reybuck et al., "*Amine Bis(phenolate) Zirconium Complexes: Influence of Ligand Structure and Cocatalyst on Copolymerization Behavior*," Macromolecules, 2005, vol. 38, pp. 2552-2558.

Tshuva et al., "*[ONXO]-Type Amine Bis(phenolate) Zirconium and Hafnium complexes as Extremely Active 1-Hexene Polymerization Catalysts*," Organometallics, 2002, vol. 21, pp. 662-670.

U.S. Appl. No. 61/779,435, filed Mar. 13, 2013, Holtcamp et al.

U.S. Appl. No. 62/168,302, filed May 29, 2015, Holtcamp et al.

U.S. Appl. No. 62/222,935, filed Sep. 24, 2015, Holtcamp et al.

U.S. Appl. No. 62/236,701, filed Oct. 2, 2015, Atienza et al.

U.S. Appl. No. 62/236,712, filed Oct. 2, 2015, Atienza et al.

U.S. Appl. No. 62/236,720, filed Oct. 2, 2015, Atienza et al.

Bucheli et al., "Spherical Clay Conglomerates: A Novel Stationary Phase for Solid-Phase Extraction and 'Reversed-Phase' Liquid Chromatography," Analytical Chemistry, vol. 71(11), Jun. 1, 1999, pp. 2171-2178.

Busico et al., "Block Copolymers of Highly Isotactic Polypropylene via Controlled Ziegler-Natta Polymerization," Macromolecules, 2004, vol. 37, pp. 8201-8203.

Cipullo et al., "Improving the Behavior of Bis(phenoxyamine) Group 4 Metal Catalysts for Controlled Alkene Polymerization," Macromolecules, 2009, vol. 42, pp. 3869-3872.

Meurs et al., "Polyethylene Chain Growth on Zinc Catalyzed by Olefin Polymerization Catalysts: A Comparative Investigation of Highly Active Catalyst Systems across the Transition Series," J. Am. Chem. Soc., 2005, vol. 127. pp. 9913-9923.

Su et al., "Oxo-Bridged Bimetallic Group 4 Complexes Bearing Amine-Bis(benzotriazole phenolate) Derivatives as Bifunctional Catalysts for Ring-Opening Polymerization of Lactide and Copolymerization of Carbon Dioxide with Cyclohexene Oxide," Organometallics, 2014, vol. 33, pp. 7091-7100.

Valente et al., "Coordinative Chain Transfer Polymerization," Chemical Reviews, 2013, vol. 113, pp. 3836-3857.

U.S. Appl. No. 62/332,940, filed May. 6, 2016, Holtcamp et al.

PCT/US2017/055131 filed Oct. 4, 2017 Hule et al.

U.S. Appl. No. 62/410,173, filed Oct. 19, 2016, Hule et al.

\* cited by examiner

SUPPORTED BIS PHENOLATE TRANSITION METALS COMPLEXES, PRODUCTION AND USE THEREOF

CROSS REFERENCE TO RELATED APPLICATIONS

This invention claims priority to and the benefit of U.S. Ser. No. 62/236,697, filed Oct. 2, 2015, and is related to U.S. Ser. No. 62/236,691, filed Oct. 2, 2015, and U.S. Ser. No. 62/236,727, filed Oct. 2, 2015, the disclosures of which are incorporated herein by reference.

FIELD OF THE INVENTION

This invention relates to supported Salan catalysts, processes utilizing such catalysts, and polymers produced thereby.

BACKGROUND OF THE INVENTION

Supported olefin polymerization catalysts are of great use in industry. Hence, there is interest in finding new supported catalyst systems that increase the commercial usefulness of the catalyst and allow the production of polymers having improved properties.

There is a need in the art for new and improved supported catalysts and catalyst systems to obtain new and improved polyolefins, polymerization processes, and the like. Accordingly, there is a need in the art for new and improved supported catalyst systems for the polymerization of olefins, in order to achieve enhanced properties, such as molecular weight, and/or comonomer incorporation, typically along with improvements in catalyst function, such as activity.

SUMMARY OF THE INVENTION

The instant disclosure is related at least in part to the discovery that certain catalyst systems that include at least one catalyst compound in combination with an activator and fluorided support, e.g., spray-dried catalyst systems, may have surprising or beneficial performance in the manufacture of polymers, particularly olefin polymers, e.g., ethylene polymers and propylene polymers. Embodiments described herein are directed to such catalyst systems, processes for the preparation of the catalyst systems, processes for the polymerization of olefins using such supported catalyst systems, polymers made using such catalyst systems, and of making articles such as films using such catalyst systems.

In one aspect, embodiments of the invention relate to catalyst systems comprising the reaction product of a fluorided support, an activator, and a catalyst compound of Formula I:

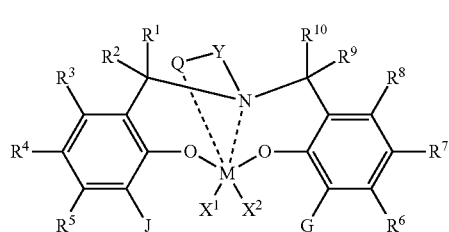

wherein:
M is a Group 4 transition metal;
$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure;
each $R^1$, $R^2$, $R^3$, $R^4$, $R^5$, $R^6$, $R^7$, $R^8$, $R^9$, and $R^{10}$ is, independently, a hydrogen, a $C_1$ to $C_{40}$ hydrocarbyl radical, a $C_1$ to $C_{40}$ substituted hydrocarbyl radical, a heteroatom or a heteroatom-containing group, or two or more of $R^1$ to $R^{10}$ may independently join together to form a $C_4$ to $C_{62}$ cyclic or polycyclic ring structure, or a combination thereof; and
Q is a neutral donor group;
J is a $C_7$ to $C_{60}$ fused polycyclic group, which optionally comprises up to 20 atoms from Groups 15 and 16, where at least one ring is aromatic and where at least one ring, which may or may not be aromatic, has at least five members;
G is as defined for J or may be hydrogen, a $C_1$ to $C_{60}$ hydrocarbyl radical, a $C_1$ to $C_{60}$ substituted hydrocarbyl radical, a heteroatom or a heteroatom-containing group, or may independently form a $C_4$ to $C_{60}$ cyclic or polycyclic ring structure with $R^6$, $R^7$, or $R^8$ or a combination thereof; and
Y is a divalent $C_1$ to $C_{20}$ hydrocarbyl or divalent $C_1$ to $C_{20}$ substituted hydrocarbyl.

In another aspect embodiments of the invention relates to methods of preparing a catalyst system. The methods comprise:
combining a fluoride compound with water, then combining with a slurry of a non-polar solvent and a support,
removing the non-polar solvent,
thereafter combining the support with a second solvent, which may be the same as or different from the non-polar solvent, an activator, and at least a first catalyst compound according to Formula I:

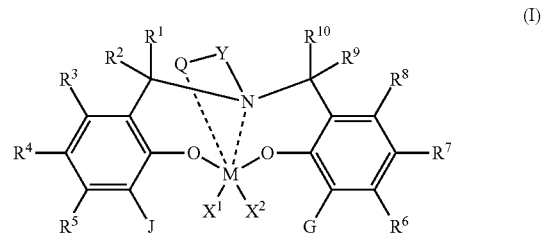

wherein:
M is a Group 4 transition metal;
$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure;
each $R^1$, $R^2$, $R^3$, $R^4$, $R^5$, $R^6$, $R^7$, $R^8$, $R^9$, and $R^{10}$ is, independently, a hydrogen, a $C_1$ to $C_{40}$ hydrocarbyl radical, a $C_1$ to $C_{40}$ substituted hydrocarbyl radical, a heteroatom or a heteroatom-containing group, or two or more of $R^1$ to $R^{10}$ may independently join together to form a $C_4$ to $C_{62}$ cyclic or polycyclic ring structure, or a combination thereof;
Q is a neutral donor group;
J is a $C_7$ to $C_{60}$ fused polycyclic group, which optionally comprises up to 20 atoms from Groups 15 and 16, where at least one ring is aromatic and where at least one ring, which may or may not be aromatic, has at least five members;

G is as defined for J or may be hydrogen, a $C_1$ to $C_{60}$ hydrocarbyl radical, a $C_1$ to $C_{60}$ substituted hydrocarbyl radical, a heteroatom or a heteroatom-containing group, or may independently form a $C_4$ to $C_{60}$ cyclic or polycyclic ring structure with $R^6$, $R^7$, or $R^8$ or a combination thereof; and Y is a divalent $C_1$ to $C_{20}$ hydrocarbyl or divalent $C_1$ to $C_{20}$ substituted hydrocarbyl.

In still another aspect, embodiments of the invention relate to polymerization processes to produce polyolefin. The processes comprise a) contacting one or more olefin monomers with the catalyst system described herein and b) obtaining olefin polymer.

DETAILED DESCRIPTION OF THE INVENTION

The specification describes supported catalyst systems that include the reaction product of a fluorided support, at least one transition metal catalyst compound, and an activator. The term "transition metal catalyst compound" is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The catalyst compounds are generally subjected to activation to perform their polymerization or oligomerization function using an activator, which is believed to create a cation as a result of the removal of an anionic group, often referred to as a leaving group, from the transition metal.

In the structures depicted throughout this specification and the claims, a solid line indicates a bond and a dashed line represents a coordinative link between the atoms.

As used herein, the numbering scheme for the Periodic Table groups is the new notation as set out in Chemical and Engineering News, 63(5), 27, (1985).

As used herein, Me is methyl, Et is ethyl, Bu is butyl, t-Bu and tBu are tertiary butyl, Pr is propyl, iPr and $^i$Pr are isopropyl, Cy is cyclohexyl, THF (also referred to as the is tetrahydrofuran, Bn is benzyl, $[H_2CO]_x$ is paraformaldehyde, and Ph is phenyl.

The terms "hydrocarbyl radical", "hydrocarbyl" and "hydrocarbyl group" are used interchangeably throughout this document unless otherwise specified. For purposes of this disclosure, a hydrocarbyl radical is defined to be $C_1$ to $C_{70}$ radicals, or $C_1$ to $C_{20}$ radicals, or $C_1$ to $C_{10}$ radicals, or $C_6$ to $C_{70}$ radicals, or $C_6$ to $C_{20}$ radicals, or $C_7$ to $C_{20}$ radicals that may be linear, branched, or cyclic and aromatic or non-aromatic.

For the purposes of this invention and the claims thereto, the new numbering scheme for the Periodic Table Groups is used as in Chem. Eng. News, 1985, 63, 27. Therefore, a "Group 4 metal" is an element from Group 4 of the Periodic Table.

The terms "hydrocarbyl radical", "hydrocarbyl" and "hydrocarbyl group" are used interchangeably throughout this document unless otherwise specified. For purposes of this disclosure, a hydrocarbyl radical is defined to be $C_1$ to $C_{70}$ radicals, or $C_1$ to $C_{20}$ radicals, or $C_1$ to $C_{10}$ radicals, or $C_6$ to $C_{70}$ radicals, or $C_6$ to $C_{20}$ radicals, or $C_7$ to $C_{20}$ radicals that may be linear, branched, or cyclic where appropriate (aromatic or non-aromatic); and includes hydrocarbyl radicals substituted with other hydrocarbyl radicals. In addition, two or more such hydrocarbyl radicals may together form a fused ring system, including partially or fully hydrogenated fused ring systems, which may include heterocyclic radicals.

The term "substituted" means that i) a hydrogen atom of a hydrocarbyl radical has been replaced by a hydrocarbyl containing group (e.g., methyl, ethyl, phenyl, etc.), a heteroatom, or a heteroatom-containing group; or ii) a carbon atom of a hydrocarbyl radical has been replaced with a heteroatom or a heteroatom-containing group. For purposes herein, a heteroatom is defined as any atom other than carbon and hydrogen. For example, methyl cyclopentadiene (Cp) is a Cp group wherein one hydrogen has been replaced with a methyl radical, which may also be referred to as a methyl functional group; ethyl alcohol is an ethyl group, wherein one of the H atoms has been replaced with the heteroatom-containing group —OH, and pyridine is considered a substituted phenyl group wherein a carbon of the benzene ring has been replaced with a nitrogen atom.

Exemplary hydrocarbyl radicals include substituted or unsubstituted methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl.

For purposes herein, hydrocarbyl radicals may also include isomers of saturated, partially unsaturated and aromatic cyclic structures wherein the radical may additionally be subjected to the types of substitutions described above. The term "aryl," "aryl radical," and/or "aryl group" refers to aromatic cyclic structures, which may be substituted with hydrocarbyl radicals and/or functional groups as defined herein. An aralkyl group is defined to be a substituted aryl group. Examples of aryl and aralkyl radicals include, but are not limited to: acenaphthenyl, acenaphthylenyl, acridinyl, anthracenyl, benzanthracenyls, benzimidazolyl, benzisoxazolyl, benzofluoranthenyls, benzofuranyl, benzoperylenyls, benzopyrenyls, benzothiazolyl, benzothiophenyls, benzoxazolyl, benzyl, carbazolyl, carbolinyl, chrysenyl, cinnolinyl, coronenyl, cyclohexyl, cyclohexenyl, methylcyclohexyl, dibenzoanthracenyls, fluoranthenyl, fluorenyl, furanyl, imidazolyl, indazolyl, indenopyrenyls, indolyl, indolinyl, isobenzofuranyl, isoindolyl, isoquinolinyl, isoxazolyl, methyl benzyl, methylphenyl, naphthyl, oxazolyl, phenanthrenyl, phenyl, pentamethylphenyl, trimethylphenyl, e.g., 2,4,6-trimethylphenyl, purinyl, pyrazinyl, pyrazolyl, pyrenyl, pyridazinyl, pyridinyl, pyrimidinyl, pyrrolyl, quinazolinyl, quinolonyl, quinoxalinyl, thiazolyl, thiophenyl, and the like.

It is to be understood that for purposes herein, when a radical is listed, it includes all substituted radicals as defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and nevopentyl (and analogous substituted cyclobutyls and cyclopropyls); and butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compounds having substitutions include all isomer forms, for example, methylphenyl would include ortho-methylphenyl, meta-methylphenyl, and para-methylphenyl; and dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

For purposes herein, a carbazole radical, a hydrocarbyl radical, is represented by the formula:

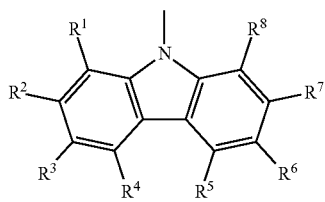

wherein:
each $R^1$ through $R^8$ is, independently, a hydrogen, a $C_1$ to $C_{40}$ hydrocarbyl radical, a functional group comprising elements from Group 13 to 17 of the periodic table of the elements, or two or more of $R^1$ to $R^8$ may independently join together to form a $C_4$ to $C_{62}$ cyclic or polycyclic ring structure, or a combination thereof. A substituted carbazole is one where at least one of $R^1$ to $R^8$ is not H.

A fluorenyl radical, another hydrocarbyl radical, is represented by the formula:

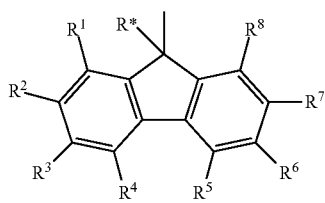

wherein: each $R^1$ through $R^8$ is, independently, a hydrogen, a $C_1$ to $C_{40}$ hydrocarbyl radical, a functional group comprising elements from Group 13 to 17 of the periodic table of the elements, or two or more of $R^1$ to $R^8$ may independently join together to form a $C_4$ to $C_{62}$ cyclic or polycyclic ring structure, or a combination thereof; $R^*$ is a hydrogen, a $C_1$ to $C_{40}$ hydrocarbyl radical, a substituted $C_1$ to $C_{40}$ hydrocarbyl radical (preferably $R^*$ is methyl, phenyl, tolyl, substituted phenyl, or substituted tolyl). A substituted flourenyl is one where at least one of $R^*$, or $R^1$ to $R^8$ is not H.

For purposes herein an "olefin," alternatively referred to as "alkene," is a linear, branched, or cyclic compound comprising carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

For purposes herein, a "polymer" has two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, the definition of copolymer, as used herein, includes terpolymers and the like. An oligomer is typically a polymer having a low molecular weight, such as Mn of less than 25,000 g/mol, or in an embodiment less than 2,500 g/mol, or a low number of mer units, such as 75 mer units or less. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For the purposes of this disclosure, the term "α-olefin" includes $C_2$ to $C_{22}$ olefins. Non-limiting examples of α-olefins include: ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include: cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

The terms "catalyst," "catalyst compound," and "transition metal compound" are defined to mean a compound capable of initiating polymerization catalysis under the appropriate conditions. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is the combination of at least one catalyst compound, at least one activator, an optional co-activator, and a support material, where the system can polymerize monomers to polymer. For the purposes of this invention and the claims thereto, when catalyst systems are described as comprising neutral stable forms of the components it is well understood by one of ordinary skill in the art that the ionic form of the component is the form that reacts with the monomers to produce polymers.

For purposes herein, the term "catalyst productivity" is a measure of how many grams of polymer (P) are produced using a polymerization catalyst comprising W g of catalyst (cat), over a period of time of T hours; and may be expressed by the following formula: P/(T×W) and expressed in units of gP*gcat$^{-1}$*hr$^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kg P/mol cat).

An "anionic ligand" is a negatively charged ligand which donates one or more pairs of electrons to a metal ion. A "neutral donor ligand" is a neutrally charged ligand which donates one or more pairs of electrons to a metal ion.

A "scavenger" is a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. In an embodiment, a co-activator can be pre-mixed with the catalyst compound to form an alkylated catalyst compound.

As used herein, Mn is number average molecular weight, Mw is weight average molecular weight, and Mz is z average molecular weight, wt % is weight percent, and mol % is mole percent. Molecular weight distribution (MWD) is defined to be Mw divided by Mn. Unless otherwise noted, all molecular weight units, e.g., Mw, Mn, Mz, are g/mol.

For purposes herein a bulky functional group is defined as a functional group having a molecular size greater than or equal to an isopropyl moiety. Accordingly, for purposes herein a bulky functional group includes substituted or unsubstituted bulky aliphatic radicals having three carbons or more, bulky alicyclic radicals having three carbons or more, and/or bulky aromatic radicals having five carbons or more, each having a molecular size greater than or equal to an isopropyl moiety.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3V$_s$, where V$_s$ is the scaled volume. V$_s$ is the sum of the relative volumes of the constituent atoms, and is calculated from the molecular formula of the substituent using the following table of relative volumes. For fused rings, the V$_s$ is decreased by 7.5% per fused ring.

| Element | Relative Volume |
| --- | --- |
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

The following abbreviations may be used throughout this specification: Me is methyl, Ph is phenyl, Et is ethyl, Pr is propyl, iPr is isopropyl, n-Pr is normal propyl, Bu is butyl, iso-butyl is isobutyl, sec-butyl refers to secondary butyl, tert-butyl, refers to tertiary butyl, n-butyl is normal butyl, pMe is para-methyl, Bz is benzyl, THF is tetrahydrofuran, Mes is mesityl, also known as 1,3,5-trimethylbenzene, Tol is toluene, TMS is trimethylsilyl, TIBAL is triisobutylaluminum, TNOAL is triisobutyl n-octylaluminum, MAO is methylalumoxane, and MOMO is methoxymethoxy (also referred to as methoxymethyl ether).

For purposes herein, RT is room temperature, which is defined as 25° C. unless otherwise specified. All percentages are weight percent (wt %) unless otherwise specified.

In the description herein, the "Salan catalyst" may be described as a catalyst precursor, a pre-catalyst compound, Salan catalyst compound or a transition metal compound, and these terms are used interchangeably.

The term "continuous" means a system that operates without interruption or cessation. For example, a continuous process to produce a polymer would be one where the reactants are continually introduced into one or more reactors and polymer product is continually withdrawn.

Catalyst Systems

Catalyst systems described herein comprise the reaction product of a fluorided support (such as fluorided silica) that preferably has not been calcined at a temperature of 400° C. or more, an activator and at least a first catalyst compound. Each of these will now be described in more detail.

Fluorided Support

As used herein, the phrases "fluorided support" and "fluorided support composition" mean a support, desirably particulate and porous, which has been treated with at least one inorganic fluorine containing compound. For example, the fluorided support composition can be a silicon dioxide support wherein a portion of the silica hydroxyl groups has been replaced with fluorine or fluorine containing compounds. Likewise, the term "support composition" means a support, desirably particulate and porous, which has been treated with at least one fluorine containing compound. Suitable fluorine containing compounds include, but are not limited to, inorganic fluorine containing compounds and/or organic fluorine containing compounds.

Supports suitable for use in this invention are generally porous materials and can include organic materials, inorganic materials, and inorganic oxides. Desirably, supports suitable for use in this invention include talc, clay, silica, alumina, magnesia, zirconia, iron oxides, boria, calcium oxide, zinc oxide, barium oxide, thoria, aluminum phosphate gel, polyvinylchloride and substituted polystyrene, and mixtures thereof. Other useful support materials include zeolites, clays, organoclays, or any other organic or inorganic support material and the like, or mixtures thereof.

Preferably, the support material is an inorganic oxide in a finely divided form. Suitable inorganic oxide materials for use in the catalyst systems described herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include: magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include Al$_2$O$_3$, ZrO$_2$, SiO$_2$, and combinations thereof, more preferably $SiO_2$, $Al_2O_3$, or $SiO_2$/$Al_2O_3$. In a preferred embodiment of the invention, the support is silica.

It is preferred that the support material, preferably an inorganic oxide, preferably silica, has a surface area in the range of from about 10 to about 800 m²/g (alternately about 10 to about 700 m²/g), pore volume in the range of from about 0.1 to about 4.0 cc/g and average particle size in the range of from about 5 to about 500 µm. More preferably, the surface area of the support material is in the range of from about 50 to about 500 m²/g, pore volume of from about 0.5 to about 3.5 cc/g and average particle size of from about 10 to about 200 µm. Most preferably the surface area of the support material is in the range of from about 100 to about 400 m²/g, pore volume from about 0.8 to about 3.0 cc/g and average particle size is from about 5 to about 100 µm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 m²/gm; pore volume of 1.65 cm³/gm). Useful silicas are available under the tradenames of DAVISON™ 952, DAVISON™ 948, or DAVISON™ 955 by the Davison Chemical Division of W.R. Grace and Company. Total surface area, also referred to as "surface area" and total pore volume, also referred to as "pore volume," and average pore diameter, also referred to as "average pore size," are measured by the Brunauer-Emmett-Teller (BET) method using adsorption-desorption of nitrogen (temperature of liquid nitrogen, 77 K) with a Micromeritics Tristar II 3020 instrument after degassing of the powders for 4 hrs at 350° C. More information regarding the method can be found, for example, in "*Characterization of Porous Solids and Powders: Surface Area, Pore Size and Density*", S. Lowell et al., Springer, 2004. Average particle size, also referred to as "particle size," or "particle diameter" is determined using a Mastersizer™ 3000 (range of 1 to 3500 µm) available from Malvern Instruments, Ltd., Worcestershire, England.

In a particularly useful embodiment, the support is silica, is desirably porous and has a surface area in the range of from about 10 to about 800 m²/g, a total pore volume in the range of from about 0.1 to about 4.0 cc/g and an average particle diameter in the range of from about 10 to about 500 µm. More desirably, the surface area is in the range of from about 50 to about 500 m²/g, the pore volume is in the range of from about 0.5 to about 3.5 cc/g and the average particle diameter is in the range of from about 15 to about 150 µm. Most desirably the surface area is in the range of from about 100 to about 400 m²/g, the pore volume is in the range of from about 0.8 to about 3.0 cc/g and the average particle diameter is in the range of from about 20 to about 100 µm. The average pore diameter of typical porous silicon dioxide support materials is in the range of from about 10 to about 1000 Å. Desirably, the support material has an average pore diameter of from about 50 to about 500 Å, and most desirably from about 75 to about 350 Å.

The fluorine compounds suitable for providing fluorine for the support may be organic or inorganic fluorine compounds and are desirably inorganic fluorine-containing compounds. Such inorganic fluorine-containing compounds may be any compound containing a fluorine atom as long as it does not contain a carbon atom. Particularly desirable are inorganic fluorine-containing compounds are selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $CalF_5$, $BrF_5$, $NF_3$, $HF$, $BF_3$, $NHF_2$, and $NH_4HF_2$. Of these, ammonium hex fluorosilicate and ammonium tetra fluoroborate are useful. Combinations of these compounds may also be used.

Ammonium hex fluorosilicate and ammonium tetra fluoroborate fluorine compounds are typically solid particulates as are the silicon dioxide supports. Typically, the fluoride supports described herein are prepared by combining an aqueous solution of fluorinating agent (such as $SiF_4$ or $(NH_4)_2SiF_6$) with a slurry of support (such as a toluene slurry of silica), then drying until it is free flowing, and, optionally, claiming (typically at temperatures over 100° C. for at least 1 hour). The supports are then combined with activator(s) and catalyst compounds (separately or together).

A useful method of treating the support with the fluorine compound is to dry mix the two components by simply blending at a concentration of from 0.01 to 10.0 mill mole F/g of support, desirably in the range of from 0.05 to 6.0 mill mole F/g of support, and most desirably in the range of from 0.1 to 3.0 millimole F/g of support. The fluorine compound can be dry mixed with the support either before or after charging to a vessel for dehydration or calcining the support. Accordingly, the fluorine concentration present on the support is preferably in the range of from 0.1 to 25 wt %, alternately 0.19 to 19 wt %, alternately from 0.6 to 3.5 wt %, based upon the weight of the support.

Another method of treating the support with the fluorine compound is to dissolve the fluorine compound in a solvent, such as water, and then contact the support (dry or combined with water or hydrocarbon solvent) with the fluorine compound containing solution. When water is used and silica is the support, it is desirable to use a quantity of water which is less than the total pore volume of the support.

A disadvantage of typical dry mix methods is that the density difference between fluorinating agent (such as ammonium hexafluorosilicate—density about 2.1 g/cm³) and silica (e.g., such as Davison™ 948—density about 0.7 g/cm³) makes it difficult to evenly/homogeneously distribute the fluorinating agent in the silica support. The density difference has also led to settling of ammonium hexafluorosilicate in fluorided silica derived from dry mix method. Over a period of two weeks, a vertical gradient of ammonium hexafluorosilicate concentrations in fluorided silica (made via dry mix method) stored in a bottle was observed. Such settling can lead to operational problems on a commercial scale.

To overcome these problems, an alternative method (wet-mixing) has been developed. The aqueous (wet-mixing) method employs a minimal amount of a polar solvent (e.g., water, or methanol, ethanol, isopropanol, or any solvent capable of dissolving the fluoride compound (such as ammonium hexafluorosilicate)) to dissolve the fluorinating agent (e.g., ammonium hexafluorosilicate). The fluoride compound solution (such as an ammonium hexafluorosilicate solution) is then added to a slurry of silica in a non-polar solvent (e.g., toluene, or benzene, or chloroform, etc.), followed by vigorous stirring of the resulting mixture. The polar/hydrophilic nature of the fluoride compound (such as ammonium hexafluorosilicate) leads to its absorption onto the hydrophilic silica surface. When the non-polar solvent is removed (by filtration), silica with an even distribution of fluorinating agent (such as ammonium hexafluorosilicate) is obtained, and ready for subsequent drying and calcination steps.

This method reduces or eliminates non-homogeneous distribution of fluorinating agent in silica associated with other methods. In addition, fluorided silica prepared via wet-mixing method gave excellent operability, whereas fluorided silica prepared via dry-mixing method often gave poor operability due to frequent plugging of catalyst feed line.

Dehydration or calcining of the silica is not necessary prior to reaction with the fluorine compound, but can be done if desired. Desirably, the reaction between the silica and fluorine compound is carried out at a temperature of from about 100° C. to about 400° C., and more desirably from about 150° C. to about 350° C. for about two to eight hours.

In one embodiment, the fluorided support composition may be generically represented by the formula: Sup-F, where "Sup" is a support, and "F" is a fluorine atom bound to the support. The fluorine atom may be bound, directly or indirectly, chemically or physically, to the support. An example of chemical or physical bonding would be covalent and ionic bonding, respectively.

In another embodiment, the fluorided support composition is represented by the formula: Sup-LF$_n$, where "Sup" is a support, preferably selected from the group consisting of talc, clay, silica, alumina, magnesia, zirconia, iron oxides, boria, calcium oxide, zinc oxide, barium oxide, thoria, aluminum phosphate gel, polyvinylchloride, and substituted polystyrene; "L" is a first member selected from the group consisting of (i) bonding, sufficient to bound the F to the Sup; (ii) B, Ta, Nb, Ge, Ga, Sn, Si, P, Ti, Mo, Re, Al, or Zr bound to the Sup and to the F; and (iii) O bound to the Sup and bound to a second member selected from the group consisting of B, Ta, Nb, Ge, Ga, Sn, Si, P, Ti, Mo, Re, Al, or Zr which is bound to the F; "F" is a fluorine atom; and "n" is a number from 1-7.

An example of such bonding sufficient to bound the F to the Sup would be chemical or physical bonding, for example, covalent and ionic bonding.

The fluorided support material is then typically slurried in a non-polar solvent and the resulting slurry is contacted with a solution of catalyst compounds and activator. In some embodiments, the slurry of the fluorided support material is first contacted with the activator for a period of time in the range of from about 0.5 hours to about 24 hours, from about 1 hour to about 16 hours, or from about 2 hours to about 8 hours. The solution of the catalyst compound is then contacted with the isolated fluorided support/activator. In some embodiments, the supported catalyst system is generated in situ. In an alternate embodiment, the slurry of the fluorided support material is first contacted with the catalyst compound for a period of time in the range of from about 0.5 hours to about 24 hours, from about 1 hour (or 2 hours) to about 16 hours, or from about 2 hours (or 4 hours) to about 8 hours. The slurry of the supported catalyst compound is then contacted with the activator solution.

The mixture of the catalysts, activator and fluorided support may be heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

In a preferred embodiment of the invention, the fluorided support material is slurried in a non-polar solvent and the resulting slurry is contacted with a solution of methylalumoxane (typically 30 wt % MAO in toluene). The fluorided support/MAO mixture is then heated to elevated temperature (30° C. to 120° C., preferably 80 to 100° C.) with vigorous stirring for a period of time (0.1 to 24 hours, preferably 1 to 3 hours). The support/activator is isolated by filtration, rinsed with non-polar solvent (e.g., toluene, pentane, hexane, etc.), and dried. The isolated support/activator is then slurried in a non-polar solvent (e.g., toluene), and a solution of catalyst compound/compounds is then contacted with the support/activator slurry. Vigorous stirring may then be applied.

In a preferred embodiment of the invention, the fluorided support material is slowly added in solid form to a solution of MAO in non-polar solvent (e.g., toluene) (typically at room temperature) with vigorous stirring. This addition sequence, namely slow and portion-wise addition of fluorided silica to MAO solution, is referred to as "reversed addition." After the addition of fluorided silica is completed, the fluorided support/MAO mixture is then heated to elevated temperature (30° C. to 120° C., preferably 80 to 100° C.) with vigorous stirring for a period of time (0.1 to 24 hours, preferably 1 to 3 hours). The support/activator is isolated by filtration, rinsed with non-polar solvent (e.g., toluene, pentane, hexane, etc.), and dried. The isolated support/activator is then slurried in a non-polar solvent (e.g., toluene), and a solution of catalyst compound/compounds is then contacted with the support/activator slurry. Vigorous stirring may be applied.

Under otherwise identical conditions, the "reversed addition" method for immobilizing MAO on fluorided silica surface offers higher polymerization activity for a wide variety of catalysts, compared to the "traditional addition" method where MAO solution is added to a slurry of fluorided silica in non-polar solvent.

Suitable non-polar solvents are materials in which all of the reactants used herein, i.e., the activator, and the catalyst compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

In a preferred embodiment of the invention, the fluorided supports described herein are prepared by combining an aqueous solution of fluorinating agent (such as $(NH_4)_2SiF_6$) with a slurry of support (such as a toluene slurry of silica), drying until free flowing, optionally, calcining (typically at temperatures from 100° C. to 400° C. for at least 1 hour), then combining with activators and catalyst compounds (the activators and catalyst compounds may be added to the support separately or together).

In another embodiment of the invention, the water to solvent ratio (by weight) is between 1:10 to 1:1000, preferably between 1:20 to 1:50.

In another embodiment of the invention, the fluorided silica support can immobilize greater than 5.0 mmol "Al" per gram silica, and preferably greater than 6.0 mmol "Al"/gram silica. The amount of "Al" (from alkylalumoxane, such as MAO) that can be immobilized on 1 gram of fluorided silica is determined by an aluminum titration experiment. The titration is done at 100° C. at ambient pressure allowing the alumoxane (15 mmol Al) and the 1 gram of fluorided silica to react for 3 hours. Thereafter, the silica is washed with toluene (10 ml, 3 times) and then washed with pentane (10 ml, 3 times). The solid is then collected and dried in vacuo for 8 hours until solvent is removed. Then the sample is weighed and the difference in weight is divided by the Mw of the aluminum compound (Mw as reported in the CHEMICAL AND ENGINEERING NEWS, 63(5), pg. 27, (1985)). Methyl alumoxane is defined to be Me-Al—O. The "Al" uptake for silica-1 in the examples below was about 5.5 mmol Al/gram, whereas the "Al" uptake for silica-2 was about 6.8 mmol/gram. Higher Al uptake (or loading) is often desirable as it is thought to offer higher polymerization activity, provided the silica and the catalyst precursor stay unchanged. In a useful embodiment of the invention, the catalyst system comprising the fluorided silica support immobilizes greater than 5.0 mmol "Al" per gram of silica, and preferably greater than 6.0 mmol "Al" per gram of silica.

Alternately, the fluorided silica support preferably contains less than 0.05 mmol/gram fluorinating agent (such as $(NH_4)_2SiF_6$), preferably less than 0.02 mmol/gram fluorinating agent, as measured by $^1H$ NMR.

Unless otherwise indicated, $^1H$ NMR data of non-polymeric compounds is collected at room temperature in a 5 mm probe using either a Bruker or Varian NMR spectrometer operating with a $^1H$ frequency of 500 MHz. Data is recorded using a 30° flip angle RF pulse, 8 scans, with a delay of 5 seconds between pulses. Samples are prepared using approximately 5-10 mg of compound dissolved in approximately 1 mL of an appropriate deuterated solvent. Samples are referenced to residual protium of the solvents at 7.15, 7.24, 5.32, 5.98, and 2.10 for D5-benzene, chloroform, D-dichloromethane, D-1,1,2,2-tetrachloroethane, and $C_6D_5CD_2H$, respectively. Unless stated otherwise, NMR spectroscopic data of polymers is recorded in a 5 mm probe on a Varian NMR spectrometer at 120° C. using a $d_2$-1,1,2,2-tetrachloroethane solution prepared from approximately 20 mg of polymer and 1 mL of solvent using a 30° flip angle RF pulse, 120 scans, with a delay of 5 seconds between pulses.

Alternately, the surface area of the fluorided silica support is greater than 200 $m^2/g$, preferably greater than 250 $m^2/g$, as determined by BET. Alternatively, the surface area of combined fluorided silica support and activator (such as MAO) is greater than 250 $m^2/g$, preferably greater than 350 $m^2/g$, as determined by BET.

In embodiments where $SiF_4$ and/or $(NH_4)_2SiF_6$ is/are the fluoriding agent, immediately after combination of the alkylalumoxane with the fluorided support the combination preferably contains less than 0.04 mmoles pre gram of silica (preferably less than 0.02 mmoles, preferably less than 0.01 mmoles) of tetraalkylsilane per gram of support as determined by $^1H$ NMR (where the alkyl is derived from the alkylalumoxane).

In useful embodiments, the ratio of mmol of fluorine per gram of silica in the fluorided support is between 0.1 and 1.5, preferably between 0.2 and 1.2, preferably between 0.4 and 1.0.

For fluorided silica prepared using $(NH_4)_2SiF_6$, the amount of residual $(NH_4)_2SiF_6$ in the silica should be equal or less than 0.04 mmol $(NH_4)_2SiF_6$/g silica, preferably equal or less than 0.02 mmol $(NH_4)_2SiF_6$/g silica, more preferably equal or less than 0.01 mmol $(NH_4)_2SiF_6$/g silica.

Catalyst Compounds

Catalyst compounds suitable in the catalyst system herein typically comprise a transition metal complex represented by the formula (I):

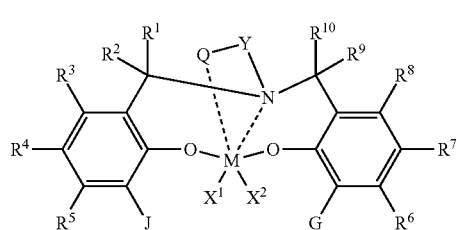

wherein:
M is a Group 4 transition metal (preferably Hf, Zr, or Ti, preferably Hf or Zr);
$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure (preferably benzyl, methyl, ethyl, chloro, bromo, and the like);
each $R^1$, $R^2$, $R^3$, $R^4$, $R^5$, $R^6$, $R^7$, $R^8$, $R^9$, and $R^{10}$ is, independently, a hydrogen, a $C_1$ to $C_{40}$ hydrocarbyl radical, a substituted $C_1$ to $C_{40}$ hydrocarbyl radical, a heteroatom, a heteroatom-containing group (alternately each $R^1$, $R^2$, $R^3$, $R^4$, $R^5$, $R^6$, $R^7$, $R^8$, $R^9$, and $R^{10}$ may be a functional group comprising of elements from Groups 13 to 17), or two or more of $R^1$ to $R^{10}$ may independently join together to form a $C_4$ to $C_{62}$ cyclic or polycyclic ring structure, or a combination thereof (preferably H, methyl, ethyl, propyl and the like);
Q is a neutral donor group, preferably a neutral donor group comprising at least one atom from Group 15 or Group 16;
J is a $C_7$ to $C_{60}$ fused polycyclic (e.g., having at least 2 ring structures) group, which, optionally, comprises up to 20 atoms from Groups 15 and 16, where at least one ring is aromatic and where at least one ring, which may or may not be aromatic, has at least five members; (preferably J comprises a five-membered ring (which may be saturated or aromatic) that is fused to at least one other cyclic group and is preferably bound to the rest of the ligand through the five-membered ring);
G is, independently, as defined for J, a hydrogen, a $C_1$ to $C_{60}$ hydrocarbyl radical, a substituted hydrocarbyl radical, a heteroatom, or a heteroatom-containing group, or may independently form a $C_4$ to $C_{60}$ cyclic or polycyclic ring structure with $R^6$, $R^7$, or $R^8$, or a combination thereof; and
Y is a divalent $C_1$ to $C_{20}$ hydrocarbyl or a substituted divalent hydrocarbyl group.

In particular embodiments, the catalyst system comprises a catalyst compound represented by the formula (II) or (III):

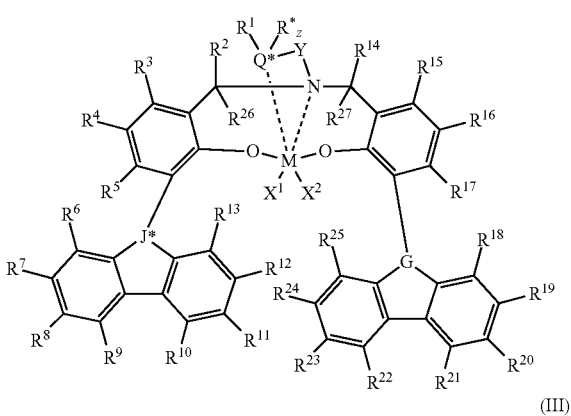

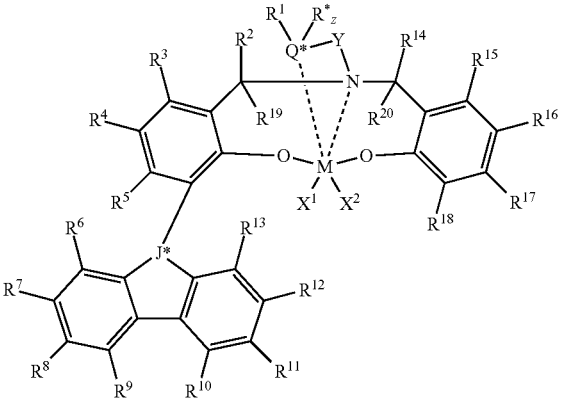

wherein:

M, $X^1$, $X^2$, $R^1$, $R^2$, $R^3$, $R^4$, $R^5$, $R^6$, $R^7$, $R^8$, $R^9$, $R^{10}$, and Y are as defined above;

Q* is a group 15 or 16 atom (preferably N, O, S, or P);

z is 0 or 1;

J* is CR" or N; and

G* is CR" or N each R", R*, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, as defined for $R^1$ above.

In any embodiment of the transition metal complexes described herein M may be Hf, Ti, or Zr.

In any embodiment of the transition metal complexes described herein, each of $X^1$ and $X^2$ is independently selected from the group consisting of hydrocarbyl radicals having from 1 to 20 carbon atoms (such as methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl), hydrides, amides, alkoxides having from 1 to 20 carbon atoms, sulfides, phosphides, halides, sulfoxides, sulfonates, phosphonates, nitrates, carboxylates, carbonates, and combinations thereof, preferably each of $X^1$ and $X^2$ is independently selected from the group consisting of halides (F, Cl, Br, I), alkyl radicals having from 1 to 7 carbon atoms (methyl, ethyl, propyl, butyl, pentyl, hexyl, heptyl, and isomers thereof), benzyl radicals, or a combination thereof.

In any embodiment of the transition metal complexes described herein, Y is a divalent $C_1$ to $C_{40}$ hydrocarbyl radical or divalent substituted hydrocarbyl radical comprising a portion that comprises a linker backbone comprising from 1 to 18 carbon atoms linking or bridging between Q and N. In an embodiment, Y is a divalent $C_1$ to $C_{40}$ hydrocarbyl or substituted hydrocarbyl radical comprising a portion that comprises a linker backbone comprising from 1 to 18 carbon atoms linking Q and N wherein the hydrocarbyl comprises O, S, S(O), $S(O)_2$, $Si(R')_2$, P(R'), N, or N(R'), wherein each R' is independently a $C_1$ to $C_{18}$ hydrocarbyl. In an embodiment, Y is selected from the group consisting of ethylene (—$CH_2CH_2$—) and 1,2-cyclohexylene. In an embodiment, Y is —$CH_2CH_2CH_2$— derived from propylene. In an embodiment, Y is selected form the group consisting of $C_1$ to $C_{20}$ alkyl groups, such as divalent methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl.

In a particular embodiment, each $R^1$, $R^2$, $R^3$, $R^4$, $R^5$, $R^6$, $R^7$, $R^8$, $R^9$, and $R^{10}$ is, independently, a hydrogen, a $C_1$ to $C_{20}$ hydrocarbyl radical, a substituted $C_1$ to $C_{20}$ hydrocarbyl radical, or two or more of $R^1$ to $R^{10}$ may independently join together to form a $C_4$ to $C_{62}$ cyclic or polycyclic ring structure, or a combination thereof.

In any embodiment of the transition metal complexes described herein, each R*, R", $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, hydrogen, a halogen, a $C_1$ to $C_{30}$ hydrocarbyl radical, a $C_1$ to $C_{20}$ hydrocarbyl radical, or a $C_1$ to $C_{10}$ hydrocarbyl radical (such as methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl).

In any embodiment of the transition metal complexes described herein each R*, R", $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, a substituted $C_1$ to $C_{30}$ hydrocarbyl radical, a substituted $C_1$ to $C_{20}$ hydrocarbyl radical, or a substituted $C_1$ to $C_{10}$ hydrocarbyl radical (such as 4-fluorophenyl, 4-chlorophenyl, 4-bromophenyl, 4-methoxyphenyl, 4-trifluoromethylphenyl, 4-dimethylaminophenyl, 4-trimethylsilylphenyl, 4-triethylsilylphenyl, trifluoromethyl, fluoromethyl, trichloromethyl, chloromethyl, mesityl, methylthio, phenylthio, (trimethylsilyl)methyl, and (triphenylsilyl)methyl).

In an embodiment, one or more of R*, R", $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is a methyl radical, a fluoride, chloride, bromide, iodide, methoxy, ethoxy, isopropoxy, trifluoromethyl, dimethylamino, diphenylamino, adamantyl, phenyl, pentafluorphenyl, naphthyl, anthracenyl, dimethylphosphanyl, diisopropylphosphanyl, diphenylphosphanyl, methylthio, and phenylthio, or a combination thereof.

In any embodiment of the transition metal complexes described herein, Q* is N, O, S, or P, preferably N, O, or S, preferably N or O, preferably N. In any embodiment of the transition metal complexes described herein, when Q* is a Group 15 atom, z is 1, and when Q* is a group 16 atom, z is 0.

In any embodiment of the transition metal complexes described herein, Q is preferably a neutral donor group comprising at least one atom from Group 15 or Group 16, preferably Q is $NR'_2$, OR', SR', $PR'_2$, where R is as defined for $R^1$ (preferably R is methyl, ethyl, propyl, isopropyl, phenyl, cyclohexyl or linked together to form a five-membered ring such as pyrrolidinyl or a six-membered ring such as piperidinyl), preferably the -(-Q-Y-)- fragment can form a substituted or unsubstituted heterocycle which may or may not be aromatic and may have multiple fused rings (for example, see compound 7-Zr, 7-Hf in the examples below). In any embodiment of the transition metal complexes described herein, Q is preferably an amine, ether, or pyridine.

In a particular embodiment of the transition metal complexes described herein, G* and J* are the same, preferably G* and J* are N, alternately G* and J* are CR'", where each R'" is H or a $C_1$ to $C_{12}$ hydrocarbyl or substituted hydrocarbyl (such as methyl, ethyl, ethenyl and isomers of propyl, butyl, pentyl, hexyl, heptyl, octyl, nonyl, decyl, undecyl, dodecyl, trifluoromethylphenyl, tolyl, phenyl, methoxyphenyl, tertbutylphenyl, fluorophenyl, diphenyl, dimethylaminophenyl, chlorophenyl, bromophenyl, iodophenyl, (trimethylsilyl)phenyl, (triethylsilyl)phenyl, (triethylsilyl)methyl, and (triethylsilyl)methyl). In a useful embodiment of the transition metal complexes described herein G* and J* are different.

In a particular embodiment of the transition metal complexes described herein G and J are the same, preferably G and J are carbazolyl, substituted carbazolyl, indolyl, substituted indolyl, indolinyl, substituted indolinyl, imidazolyl, substituted imidazolyl, indenyl, substituted indenyl, indanyl, substituted indanyl, fluorenyl, or substituted fluorenyl. In a useful embodiment of the transition metal complexes described herein G and J are different.

In an embodiment, M is Zr or Hf; $X^1$ and $X^2$ are benzyl radicals; $R^1$ is a methyl radical; $R^2$ through $R^{27}$ are hydrogen; Y is ethylene (—$CH_2CH_2$—), Q*, G* and J* are N, and Rz* is a methyl radical.

In an embodiment, M is Zr or Hf; $X^1$ and $X^2$ are benzyl radicals; $R^4$ and $R^7$ are methyl radicals; $R^1$ through $R^3$, $R^5$ through $R^6$, and $R^8$ through $R^{10}$ are hydrogen; and Y is ethylene, (—$CH_2CH_2$—), Q is an N-containing group, G and J are carbazolyl or fluorenyl. In a preferred combination, G and J are carbazolyl and Q is an amine group; or, G and J are substituted fluorenyl and Q is an amine, ether. or pyridine.

In a particularly preferred embodiment of the invention, the catalyst complex is represented by formula (IV) or (V):

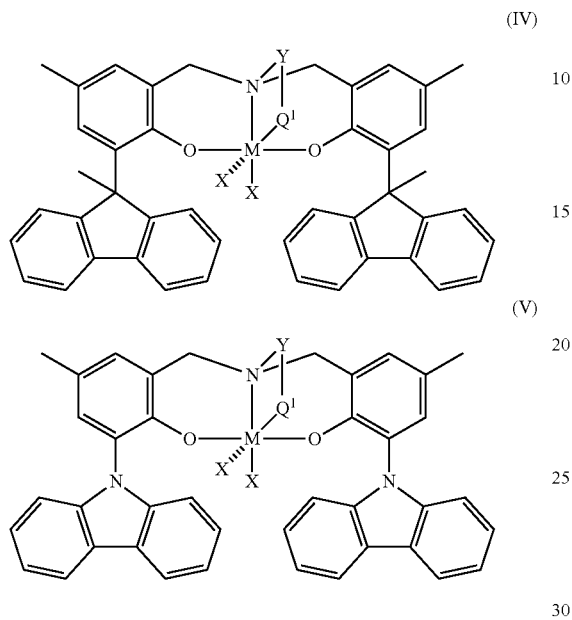

wherein:
Y is a $C_1$-$C_3$ divalent hydrocarbyl, $Q^1$ is $NR'_2$, OR, SR, $PR'_2$, where R is as defined for $R^1$ (preferably R' is methyl, ethyl, propyl, isopropyl, phenyl, cyclohexyl or linked together to form a five-membered ring such as pyrrolidinyl or a six-membered ring such as piperidinyl), alternately the -(-Q-Y-)- fragment can form a substituted or unsubstituted heterocycle, which may or may not be aromatic, and may have multiple fused rings, M is Zr, Hf, or Ti and each X is, independently, as defined for $X^1$ above, preferably each X is benzyl, methyl, ethyl, chloride, bromide, or alkoxide.

Methods to Prepare the Catalyst Compounds.

In an embodiment of the invention, the transition metal compounds may be prepared by two general synthetic routes. In an embodiment of the invention, the parent Salan ligands may be prepared by a one-step Mannich reaction from the parent phenol (Reaction A) or by a two-step imine-condensation/alkylation procedure if an aldehyde located ortho to a hydroxy functional group (e.g., a substituted salicylaldehyde base structure) is used (Reaction B). The Salan ligand is then converted into the metal di-substituted catalyst precursor by reaction with the metal tetra-substituted starting material to yield the finished complex. In an embodiment of the invention, the Salan ligand is then converted into the metal dibenzyl catalyst precursor by reaction with the metal tetra-aryl starting material, e.g., tetrabenzyl, to yield the finished complex (Reaction C).

Reaction A:

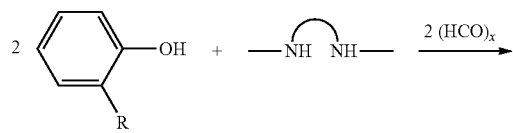

Reaction B:

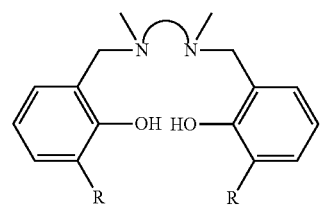

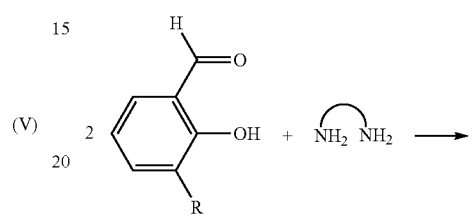

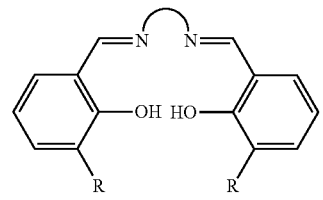

Reaction C:

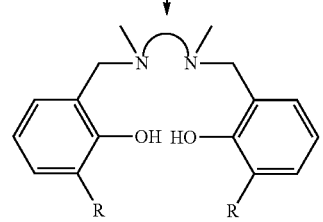

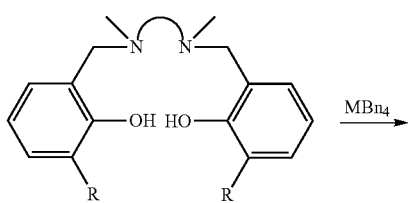

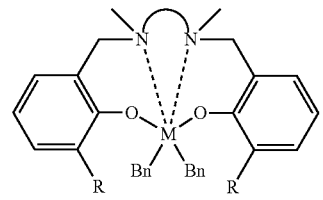

Activators

The terms "cocatalyst" and "activator" are used herein interchangeably and are defined to be any compound which can activate any one of the catalyst compounds described above by converting the neutral catalyst compound to a catalytically active catalyst compound cation.

After the complexes described above have been synthesized, catalyst systems may be formed by combining them with activators in any manner known from the literature including by supporting them for use in slurry or gas phase polymerization.

Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, 6-bound, metal ligand making the metal complex cationic and providing a charge-balancing non-coordinating or weakly coordinating anion.

Alumoxane Activators

In one embodiment, alumoxane activators are utilized as an activator in the catalyst system. Alumoxanes are generally oligomeric compounds containing —Al(R$^1$)—O— sub-units, where R$^1$ is an alkyl group. Examples of alumoxanes include: methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mol %, alternately the alumoxane is present at a molar ratio of aluminum to catalyst compound transition metal less than 500:1, preferably less than 300:1, preferably less than 100:1, preferably less than 1:1.

Non-Coordinating Anion Activators

A non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon. A stoichiometric activator can be either neutral or ionic. The terms ionic activator, and stoichiometric ionic activator can be used interchangeably. Likewise, the terms neutral stoichiometric activator, and Lewis acid activator can be used interchangeably. The term non-coordinating anion includes neutral stoichiometric activators, ionic stoichiometric activators, ionic activators, and Lewis acid activators.

"Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or a combination thereof. It is also within the scope of this invention to use neutral or ionic activators alone or in combination with alumoxane or modified alumoxane activators.

The catalyst systems of this invention can include at least one non-coordinating anion (NCA) activator.

In a preferred embodiment, boron containing NCA activators represented by the formula below can be used:

$$Z_d^+(A^{d-})$$

wherein:
Z is (L-H) or a reducible Lewis acid;
L is a neutral Lewis base;
H is hydrogen;
(L-H) is a Bronsted acid;
A$^{d-}$ is a boron containing non-coordinating anion having the charge d−; and
d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the transition metal catalyst precursor, resulting in a cationic transition metal species.

The activating cation $Z_d^+$ may also be a moiety such as silver, tropylium, carboniums, ferroceniums and mixtures, preferably carboniums and ferroceniums. Most preferably $Z_d^+$ is triphenyl carbonium. Preferred reducible Lewis acids can be any triaryl carbonium (where the aryl can be substituted or unsubstituted, such as those represented by the formula: (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl), preferably the reducible Lewis acids in formula (14) above as "Z" include those represented by the formula: (Ph$_3$C), where Ph is a substituted or unsubstituted phenyl, preferably substituted with C$_1$ to C$_{40}$ hydrocarbyl(s) or substituted with C$_1$ to C$_{40}$ hydrocarbyl(s), preferably C$_1$ to C$_{20}$ alkyl(s) or aromatic(s) or substituted C$_1$ to C$_{20}$ alkyl(s) or aromatic(s), preferably Z is a triphenylcarbonium.

When $Z_d^+$ is the activating cation (L-H)$_d^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds which may be used as an activating cocatalyst are the compounds described as (and particularly those specifically listed as) activators in U.S. Pat. No. 8,658,556, which is incorporated herein by reference.

Most preferably, the ionic stoichiometric activator $Z_d^+$ $(A^{d-})$ is one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

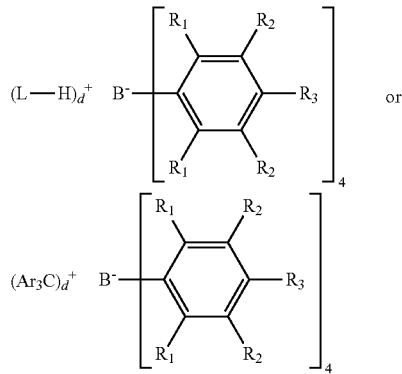

wherein:
each $R_1$ is, independently, a halide, preferably a fluoride;
Ar is substituted or unsubstituted aryl group (preferably a substituted or unsubstituted phenyl, preferably substituted with $C_1$ to $C_{40}$ hydrocarbyls, preferably $C_1$ to $C_{20}$ alkyls or aromatics;

each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group); each $R_3$ is a halide, $C_6$ to $C_{20}$ substituted aromatic hydrocarbyl group or a siloxy group of the formula O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);
L is a neutral Lewis base; $(L-H)^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

Preferably $(Ar_3C)_d^+$ is $(Ph_3C)_d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.

Particularly useful bulky activators are described in U.S. Pat. No. 8,658,556, which is incorporated herein by reference.

In another embodiment, one or more of the NCA activators is chosen from the activators described in U.S. Pat. No. 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Ph_3C^+][B(C_6F_5)_4^-]$, $[Me_3NH^+][B(C_6F_5)_4^-]$, 1-(4-(tris(pentafluorophenyl)borate)-2,3,5,6-tetrafluorophenyl) pyrrolidinium, tetrakis(pentafluorophenyl)borate, and 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl) borate, triphenylcarbenium tetrakis(perfluorobiphenyl) borate, and triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, and di-(i-propyl)ammonium tetrakis(pentafluorophenyl)borate, (where alkyl is methyl, ethyl, propyl, n-butyl, sec-butyl, or t-butyl).

The typical activator-to-catalyst compound ratio, e.g., all NCA activators-to-catalyst compound ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably from 1:1 to 5:1.

It is also within the scope of this invention that the catalyst compounds can be combined with combinations of alumoxanes and NCA's (see, for example, U.S. Pat. No. 5,153,157; U.S. Pat. No. 5,453,410; EP 0 573 120; WO 94/07928; and WO 95/14044), which discuss the use of an alumoxane in combination with an ionizing activator.

Scavengers and Co-Activators

The catalyst system may further include scavengers and/or co-activators. In some embodiments, when using the complexes described herein, particularly when they are immobilized on a support, the catalyst system will additionally comprise one or more scavenging compounds. Here, the term "scavenging compound" means a compound that removes polar impurities from the reaction environment. A scavenger is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the transition metal compound to form an alkylated transition metal compound.

Typically, the scavenging compound will be an organometallic compound such as the Group-13 organometallic compounds of U.S. Pat. No. 5,153,157; U.S. Pat. No. 5,241,025; WO 91/09882; WO 94/03506; WO 93/14132; and that of WO 95/07941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, $[Me_2HNPh]^+[B(pfp)_4]^-$ or $B(pfp)_3$ (perfluorophenyl=pfp=$C_6F_5$). In an embodiment, the scavengers are present at less than 14 wt %, or from 0.1 to 10 wt %, or from 0.5 to 7 wt %, by weight of the catalyst system.

Suitable aluminum alkyl or organoaluminum compounds which may be utilized as co-activators include, for example, trimethylaluminum, triethylaluminum, triisobutylaluminum, tri-n-hexylaluminum, tri-n-octylaluminum, and the like. In an embodiment, the co-activators are present at less than 14 wt %, or from 0.1 to 10 wt %, or from 0.5 to 7 wt %, by weight of the catalyst system. Alternately, the complex-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1; 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; or 1:10 to 2:1.

Chain Transfer Agents (CTAs)

A "chain transfer agent" is any agent capable of hydrocarbyl and/or polymeryl group exchange between a coordinative polymerization catalyst and the metal center of the chain transfer agent during a polymerization process. The chain transfer agent can be any desirable chemical compound such as those disclosed in WO 2007/130306. Preferably, the chain transfer agent is selected from Group 2, 12, or 13 alkyl or aryl compounds; preferably zinc, magnesium, or aluminum alkyls or aryls; preferably, where the alkyl is a $C_1$ to $C_{30}$ alkyl, alternately, a $C_2$ to $C_{20}$ alkyl, alternately, a $C_3$ to $C_{12}$ alkyl, typically selected independently from methyl, ethyl, propyl, butyl, isobutyl, tertbutyl, pentyl, hexyl, cyclohexyl, phenyl, octyl, nonyl, decyl, undecyl, and dodecyl; and where di-ethylzinc is particularly preferred.

In a particularly useful embodiment, this invention relates to a catalyst system comprising activator, catalyst complex as described herein, and chain transfer agent wherein the chain transfer agent is selected from Group 2, 12, or 13 alkyl or aryl compounds.

In a particularly useful embodiment, the chain transfer agent is selected from dialkyl zinc compounds, where the alkyl is selected independently from methyl, ethyl, propyl, butyl, isobutyl, tertbutyl, pentyl, hexyl, cyclohexyl, and phenyl.

In a particularly useful embodiment, the chain transfer agent is selected from trialkyl aluminum compounds, where the alkyl is selected independently from methyl, ethyl, propyl, butyl, isobutyl, tertbutyl, pentyl, hexyl, and cyclohexyl.

In a particularly useful embodiment, the chain transfer agent is selected from tri aryl aluminum compounds where the aryl is selected from phenyl and substituted phenyl.

Useful chain transfer agents are typically present at from 10 or 20 or 50 or 100 equivalents to 600 or 700 or 800 or 1000 or 2000 or 4000 equivalents relative to the catalyst component. Alternately, the chain transfer agent is preset at a catalyst complex-to-CTA molar ratio of from about 1:12,000 to 10:1; alternatively, 1:6,000; alternatively, 1:3,000 to 10:1; alternatively, 1:2,000 to 10:1; alternatively, 1:1,000 to 10:1; alternatively, 1:500 to 1:1; alternatively, 1:300 to 1:1; alternatively, 1:200 to 1:1; alternatively, 1:100 to 1:1; alternatively, 1:50 to 1:1; or alternatively, 1:10 to 1:1.

Useful chain transfer agents include diethylzinc, tri-n-octyl aluminum, trimethylaluminum, triethylaluminum, tri-isobutylaluminum, tri-n-hexylaluminum, diethyl aluminum chloride, dibutyl zinc, di-n-propylzinc, di-n-hexylzinc, di-n-pentylzinc, di-n-decylzinc, di-n-dodecylzinc, di-n-tetradecylzinc, di-n-hexadecylzinc, di-n-octadecylzinc, diphenylzinc, diisobutylaluminum hydride, diethylaluminum hydride, di-n-octylaluminum hydride, dibutylmagnesium, diethylmagnesium, dihexylmagnesium, and triethylboron.

In a preferred embodiment, two or more catalyst systems are combined with diethyl zinc and/or tri-n-octylaluminum in the same reactor with monomer(s).

In a preferred embodiment, one or more catalyst systems are combined with a mixture of diethyl zinc and an aluminum reagent in the same reactor with monomer(s). Alternately, one or more catalyst systems are combined with two chain transfer agents in the same reactor with monomer(s).

Methods of Preparing the Catalysts Systems

The catalysts systems described herein may be prepared by any suitable method. In an embodiment, this invention describes the preparation of fluorided supports (such as silica) through the addition of an aqueous solution of fluorine compound (such as $(NH_4)_2SiF_6$ to a slurry of support (such as a toluene slurry of silica). This preparation method contributes to an even distribution of the fluoride compound (such as $(NH_4)_2SiF_6$) onto the support surface (such as the silica surface), in contrast to a less homogeneous distribution observed when the solid salt is combined with the solid silica as described in US 2002/0123582 A1. Catalyst compounds supported on the fluorided support from this preparation exhibit comparable or higher activity compared to supported catalysts on fluorided supports made through solid/solid mixing.

In an embodiment, an aqueous solution of fluorinating agent (such as $(NH_4)_2SiF_6$) is added to a slurry of support (such as a toluene slurry of silica). Vigorous stirring of the mixture allows the dissolved fluorine compound (in water) to be evenly absorbed onto the hydrophilic support surface. After filtration, the wet support is allowed to air dry until it is free flowing, and then may be calcined (typically at temperatures over 100° C. for at least 1 hour).

In a particularly useful embodiment of the invention, the catalyst systems described herein are prepared by:

1. Fluorided silica preparation: The aqueous method typically employs a minimal amount of a polar solvent (e.g., water, methanol, ethanol, isopropanol, or any solvent capable of dissolving the fluoride compound (such as ammonium hexafluorosilicate) to dissolve the fluorinating agent (such as ammonium hexafluorosilicate), but can use an excess of solvent if desired. The solution (typically ammonium hexafluorosilicate solution) is then added to a slurry of silica in a non-polar solvent (e.g., toluene, benzene, or chloroform, etc.), followed by vigorous stirring of the resulting mixture. The polar/hydrophilic nature of the fluorinating agent (such as ammonium hexafluorosilicate) leads to its absorption onto the hydrophilic silica surface. When the non-polar solvent is removed (by filtration), silica with an even distribution of fluorinating agent (such as ammonium hexafluorosilicate) is obtained, and ready for subsequent drying and calcination steps.

2a. Immobilization of alumoxane on fluorided silica: In a preferred embodiment of the invention, the fluorided support material is then slurried in a non-polar solvent and the resulting slurry is contacted with a solution of alumoxane (such as methylalumoxane). The fluorided support/alumoxane mixture is then heated to elevated temperature (30° C. to 120° C., preferably 80-100° C.) with vigorous stirring for a period of time (0.1 to 24 hours, preferably 1 to 3 hours). The support/activator is isolated by filtration, rinsed with non-polar solvent (e.g., toluene, pentane, hexane, etc.), and dried. The isolated support/activator is then slurried in a non-polar solvent (e.g., toluene), and a solution of catalyst compound/compounds is then contacted with the support/activator slurry. Vigorous stirring is typically applied.

2b. Immobilization of fluorided silica in solid form: In an alternate embodiment of the invention, the fluorided support material may be slowly added in solid form to a solution of alumoxane in non-polar solvent (e.g., toluene) (typically at room temperature) with vigorous stirring. This addition sequence, namely slow and portion-wise addition of fluorided silica to the alumoxane solution, is referred to as "reversed addition." After the addition of fluorided silica is completed, the fluorided support/alumoxane mixture is then heated to elevated temperature (30° C. to 120° C., preferably 80 to 100° C.) with vigorous stirring for a period of time (0.1 to 24 hours, preferably 1 to 3 hours). The support/activator is then isolated by filtration, rinsed with non-polar solvent (e.g., toluene, pentane, hexane, etc.), and dried. The isolated support/activator is then slurried in a non-polar solvent (e.g., toluene), and a solution of catalyst compound/compounds is then contacted with the support/activator slurry. Vigorous stirring is typically applied. Under otherwise identical condition, the reversed addition method for immobilizing MAO on fluorided silica surface offers higher polymerization activity for a wide variety of catalysts, compared to the "traditional addition" method where methylalumoxane solution is added to a slurry of fluorided silica in non-polar solvent.

3. Activation and supportation of catalysts on silica/MAO support: The silica/MAO support/activator generated in the MAO immobilization step 2 (a or b) is slurried in a non-polar solvent (e.g., toluene). The resulting slurry is then contacted with a solution of catalysts (two catalyst precursors or more) with vigorous stirring. The mixture is stirred for 0.5 hour to 24 hours (preferably for 1 to 3 hours) at a temperature between 23° C. to 110° C. (preferably at 20 to 40° C.). The finished supported catalyst is then isolated by filtration, rinsed with non-polar solvent (e.g., toluene, pentane, etc.), and dried.

4. The catalyst compounds can be dissolved together with solvent to create one solution, or each catalyst can be dissolved individually.

5. The multiple catalyst compounds can be added to silica/alumoxane support/activator slurry together in one solution, or individual solution of each catalyst precursor can be added in any order/sequence. In a preferred embodiment of the invention, the multiple catalyst compounds are added to silica/alumoxane support/activator slurry together in one solution.

Some catalyst systems are formed by spray drying. Preparation of the spray dried catalyst system can include mixing or otherwise combining the one or more catalyst compounds, one or more activators, one or more filler materials, and one or more diluents to produce a suspension. The suspension can then be spray dried to produce the spray dried catalyst system.

The components of the suspension can be combined in any suitable order or sequence. For example, the diluent or a portion of the diluent, the filler material, and the activator can be combined to produce a first mixture. The first mixture can be stirred or otherwise mixed for a period of time ranging from about 1 minute to about 24 hours. The first mixture can be mixed at a temperature ranging from room temperature up to a temperature of about 40° C., about 60° C., about 80° C., or about 100° C. After mixing the first mixture the catalyst compound(s) can be combined with the first mixture to produce a second mixture. If only a portion of the diluent is combined in the first mixture, the catalyst compound(s) and the remaining diluent can first be combined and then added to the first mixture to produce the second mixture. The second mixture can be mixed for a period of time ranging from about 1 minute to about 24 hours. The second mixture can be mixed at a temperature ranging from room temperature to about 40° C., about 60° C., about 80° C., or about 100° C. The first mixture and/or the second mixture can be mixed under an inert atmosphere such as nitrogen.

The diluent(s) can be or include any material capable of dissolving or suspending the catalyst catalyst compound and activator and suspending the filler material. Illustrative diluents can include, but are not limited to, linear and/or branched alkanes such as ethane, propane, butane, isobutene, pentane, isopentane, hexane, heptane, octane, decane, dodecane, hexadecane, octadecane, and the like; alicyclic hydrocarbons such as cyclopentane, methylcyclopentane, cyclohexane, cyclooctane, norbornane, ethylcyclohexane, and the like; aromatic hydrocarbons such as benzene, toluene, ethylebenzene, propylbenzene, butylbenzene, xylene, and the like; petroleum fractions such as gasoline, kerosene, light oils, and the like. Likewise, halogenated hydrocarbons such as methylene chloride, dichloromethane, chlorobenzne, and the like, can also be used. Any two or more diluents can be used together to provide the diluent. The diluent can have a boiling point ranging from about 0° C. to about 150° C.

The particular amount or concentration of the various components of the catalyst system in the suspension can vary depending, at least in part, on the particular catalyst compound(s), activator(s), filler material(s), and/or diluent(s) present therein. For example, the suspension can have a concentration of the catalyst compound ranging from a low of about 0.05 wt %, about 0.09 wt %, or about 0.15 wt % to a high of about 0.4 wt %, about 0.8 wt %, or about 1.2 wt %. In another example, the suspension can have a catalyst compound concentration of from about 0.13 wt % to about 0.22 wt %, about 0.14 wt % to about 0.2 wt %, or about 0.15 wt % to about 0.19 wt %. The suspension can have a concentration of the filler material ranging from a low of about 1 wt %, about 3 wt % or about 5 wt % to a high of about 10 wt %, about 15 wt %, or about 20 wt %. In another example, the suspension can have a concentration of the filler material of from about 3 wt % to about 8 wt %, about 4 wt % to about 7 wt %, or about 5 wt % to about 6 wt %. The suspension can have a concentration of the activator ranging from a low of about 1 wt %, about 2 wt %, or about 3 wt % to a high of about 6 wt %, about 8 wt %, or about 10 wt %. The suspension can have a diluent concentration ranging from a low of about 70 wt %, about 75 wt %, or about 80 wt % to a high of about 90 wt %, about 95 wt %, or about 98 wt %.

The suspension can be atomized and introduced into a stream of heated, inert drying gas such as nitrogen, argon, propane, and the like, or any combination thereof to evaporate the diluent and produce solid-form particles of the catalyst compound and activator in a matrix of the filler material. The volumetric flow of the drying gas can be greater than the volumetric flow of the suspension. The suspension can be atomized using any suitable device(s), system(s), or combination of device(s) and/or system(s). For example, the suspension can be atomized via an atomizing nozzle or a centrifugal high speed disc atomizer.

Atomization of the suspension via an atomizing nozzle can also include mixing the suspension with an atomizing gas. The temperature of the atomizing nozzle can be at or above the boiling point of the highest boiling component of the final suspension. The atomized suspension can be introduced to a drying chamber where the volatiles can dry in the presence of the heated, inert drying gas. If any spray dried catalyst system particles having an undesirably large diameter are produced, at least a portion of those over-sized particles can be separated within a collection zone of the drying chamber. Spray dried catalyst system particles having a desired size can be recovered from the drying chamber and can then be separated from the inert drying gas. For example, the spray dried catalyst system particles and the drying gas can be separated within a cyclone. Other suitable processes for preparing the spray dried catalyst system can be similar to those discussed and described in, for example, U.S. Pat. No. 4,638,029; U.S. Pat. No. 4,728,705; U.S. Pat. No. 5,290,745; U.S. Pat. No. 5,306,350; U.S. Pat. No. 5,604,172; U.S. Pat. No. 5,716,558; U.S. Pat. No. 6,982,236; US 2006/0293470; and US 2007/0191215. Another nozzle is described in WO 2008/42078, which is incorporated herein by reference.

Spray drying produces discrete catalyst system particles or particulates after evaporation of the diluent. The amount of filler present in the spray dried catalyst system can range from a low of about 5 wt %, about 10 wt %, about 15 wt %, or about 20 wt % to a high of about 50 wt %, about 60 wt %, about 70 wt %, or about 80 wt %, based on total weight of the spray dried catalyst system. For example, the spray dried catalyst system can contain from about 50 wt % to about 70 wt %, from about 52 wt % to about 65 wt %, or from about 54 wt % to about 60 wt %, based on the total weight of the filler material, the catalyst compound(s), and the activator(s).

The spray dried catalyst system can have an average particle size ranging from about 1 µm to about 500 µm. For example, the spray dried catalyst system can have an average particle size ranging from a low of about 1 µm, about 5 µm, or about 10 µm to a high of about 50 µm, about 80 µm, or about 100 µm. In another example, the spray dried catalyst system can have an average particle size of from about 5 µm to about 100 µm, from about 10 µm to about 80 µm, or from about 15 µm to about 70 µm. The spray dried catalyst system preferably has a bulk density ≥about 0.2 g/cm$^3$, e.g., ≥about 0.24 g/cm$^3$, ≥about 0.28 g/cm$^3$, etc. Additionally or alternatively, the bulk density may be ≤about 0.38 g/cm$^3$, e.g., ≤about 0.35 g/cm$^3$, ≤about 0.32 g/cm$^3$, etc. Particular ranges of the bulk density include ranges formed by any pair of the above-enumerated values, e.g., about 0.20 to about 0.38 g/cm$^3$, about 0.24 to about 0.38 g/cm$^3$, about 0.28 to about 0.38 g/cm$^3$, about 0.20 to about 0.35 g/cm$^3$, about 0.24 to about 0.35 g/cm$^3$, about 0.28 to about 0.35 g/cm$^3$, about 0.20 to about 0.32 g/cm$^3$, about 0.24 to about 0.32 g/cm$^3$, about 0.28 to about 0.32 g/cm$^3$, etc. Bulk density is determined by ASTM D1895.

Polymerization Processes

In an embodiment, a polymerization processes includes contacting monomers (such as ethylene and propylene), and optionally comonomers, with a catalyst system comprising an activator and at least one catalyst compound, as described above. In an embodiment, the catalyst compound and activator may be combined in any order, and may be combined prior to contacting with the monomer. In an embodiment, the catalyst compound and/or the activator are combined after contacting with the monomer.

Monomers useful herein include substituted or unsubstituted $C_2$ to $C_{40}$ alpha olefins, or $C_2$ to $C_{20}$ alpha olefins, or $C_2$ to $C_{12}$ alpha olefins, or ethylene, propylene, butene, pentene, hexene, heptene, octene, nonene, decene, undecene, dodecene and isomers thereof. In an embodiment of the invention, the monomer comprises propylene and optional comonomers comprising one or more ethylene or $C_4$ to $C_{40}$ olefins, or $C_4$ to $C_{20}$ olefins, or $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In an embodiment, the monomer comprises ethylene or ethylene and a comonomer comprising one or more $C_3$ to $C_{40}$ olefins, or $C_4$ to $C_{20}$ olefins, or $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, or hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, or norbornene, norbornadiene, and dicyclopentadiene.

In an embodiment, one or more dienes are present in the polymer produced herein at up to 10 wt %, or at 0.00001 to 1.0 wt %, or 0.002 to 0.5 wt %, or 0.003 to 0.2 wt %, based upon the total weight of the composition. In an embodiment, 500 ppm or less of diene is added to the polymerization, or 400 ppm or less, or 300 ppm or less. In an embodiment, at least 50 ppm of diene is added to the polymerization, or 100 ppm or more, or 150 ppm or more.

Diolefin monomers useful in this invention include any hydrocarbon structure, or $C_4$ to $C_{30}$, having at least two unsaturated bonds, wherein at least two of the unsaturated bonds are readily incorporated into a polymer by either a stereospecific or a non-stereospecific catalyst(s). In an embodiment, the diolefin monomers may be selected from alpha, omega-diene monomers (i.e., di-vinyl monomers). Preferably, the diolefin monomers are linear di-vinyl monomers, most or those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes according to the instant disclosure may be carried out in any manner known in the art. Any suspension, bulk, slurry, or gas phase polymerization process known in the art can be used. Such processes can be run in a batch, semi-batch, or continuous mode. Gas phase polymerization processes and slurry processes are suitable for use herein. Alternately, the polymerization is not a homogeneous process where a homogeneous polymerization process is defined to be a process where at least 90 wt % of the product is soluble in the reaction media. Alternately the polymerization is not a solution process where a solution polymerization process is defined to be a process where the catalyst and the product are soluble in the reaction media. A bulk homogeneous process is suitable for use herein, wherein a bulk process is defined to be a process where monomer concentration in all feeds to the reactor is 70 vol % or more. In an embodiment, no solvent or diluent is present or added in the reaction medium, (except for the small amounts used as the carrier for the catalyst system or other additives, or amounts typically found with the monomer; e.g., propane in propylene). In an embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkyl substituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In an embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In an embodiment, the solvent is not aromatic, or aromatics are present in the solvent at less than 1 wt %, or less than 0.5 wt %, or less than 0.0 wt %, based upon the weight of the solvents.

In an embodiment, the feed concentration of the monomers and comonomers for the polymerization is 60 vol % solvent or less, or 40 vol % or less, or 20 vol % or less, based on the total volume of the feedstream. Or the polymerization is run in a bulk process.

Polymerizations can be run at any temperature and/or pressure suitable to obtain the desired ethylene polymers. Suitable temperatures and/or pressures include a temperature in the range of from about 0° C. to about 300° C., or from about 20° C. to about 200° C., or from about 35° C. to about 150° C., or from about 50° C. to about 150° C., or from about 40° C. to about 120° C., or from about 45° C. to about 80° C.; and at a pressure in the range of from about 0.35 MPa to about 10 MPa, or from about 0.45 MPa to about 6 MPa, or from about 0.5 MPa to about 4 MPa.

In an embodiment, the run time of the reaction is from about 0.1 minutes to about 24 hours, or up to 16 hours, or in the range of from about 5 to 250 minutes, or from about 10 to 120 minutes.

In an embodiment, hydrogen is present in the polymerization reactor at a partial pressure of 0.001 to 50 psig (0.007 to 345 kPa), or from 0.01 to 25 psig (0.07 to 172 kPa), or 0.1 to 10 psig (0.7 to 70 kPa).

In an embodiment, the activity of the catalyst is at least 50 g/mmol/hour, or 500 or more g/mmol/hour, or 5000 or more g/mmol/hr, or 50,000 or more g/mmol/hr. In an alternate embodiment, the conversion of olefin monomer is at least 10%, based upon polymer yield and the weight of the monomer entering the reaction zone, or 20% or more, or 30% or more, or 50% or more, or 80% or more.

In an embodiment, the polymerization conditions include one or more of the following: 1) temperatures of 0 to 300° C. (or 25 to 150° C., or 40 to 120° C., or 45 to 80° C.); 2) a pressure of atmospheric pressure to 10 MPa (or 0.35 to 10 MPa, or from 0.45 to 6 MPa, or 0.5 to 4 MPa); 3) the presence of an aliphatic hydrocarbon solvent (such as isobutane, butane, pentane, isopentane, hexanes, isohexane, heptane, octane, dodecane, and mixtures thereof; cyclic and alicyclic hydrocarbons, such as, cyclohexane, cycloheptane, methylcyclohexane, methylcycloheptane, and mixtures thereof; or where aromatics are or present in the solvent at less than 1 wt %, or less than 0.5 wt %, or at 0 wt % based upon the weight of the solvents); and/or 4) optionally, hydrogen is present in the polymerization reactor at a partial pressure of 0.007 to 345 kPa (0.001 to 50 psig) (or from 0.07 to 172 kPa (0.01 to 25 psig), or 0.7 to 70 kPa (0.1 to 10 psig)).

In an embodiment, the catalyst system used in the polymerization comprises no more than one catalyst compound. A "reaction zone" also referred to as a "polymerization zone," is a vessel where polymerization takes place, for example, a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In an embodiment, the polymerization occurs in one reaction zone.

Polyolefin Products

The instant disclosure also relates to processes for using the catalyst systems described herein in olefin polymerization. Thus, the invention relates in part to processes for producing olefin polymers, e.g., polyethylene and polypropylene homopolymers and copolymers, particularly alpha-olefin copolymers. In an embodiment, the polymers produced herein are homopolymers of ethylene or propylene, are copolymers of ethylene having from 0 to 25 mol % (or from 0.5 to 20 mol %, or from 1 to 15 mol %, or from 3 to 10 mol %) of one or more $C_3$ to $C_{20}$ olefin comonomer (or $C_3$ to $C_{12}$ alpha-olefin, or propylene, butene, hexene, octene, decene, dodecene, or propylene, butene, hexene, octene), or are copolymers of propylene having from 0 to 25 mol % (or from 0.5 to 20 mol %, or from 1 to 15 mol %, or from 3 to 10 mol %) of one or more of $C_2$ or $C_4$ to $C_{20}$ olefin comonomer (or ethylene or $C_4$ to $C_{12}$ alpha-olefin, or ethylene, butene, hexene, octene, decene, dodecene, or ethylene, butene, hexene, octene).

In an embodiment, the monomer is ethylene and the comonomer is hexene, or from 1 to 15 mol % hexene, or 1 to 10 mol % hexene.

In an embodiment, the polymers produced herein have an Mw of 5,000 to 3,500,000 g/mol (e.g., 25,000 to 750,000 g/mol, 50,000 to 500,000 g/mol, 100,000 to 2,000,000 g./mol, etc.), and/or an Mw/Mn of greater than 1 to 40, or 1.2 to 20, or 1.3 to 10, or 1.4 to 5, or 1.5 to 4, or 1.5 to 3.

In an embodiment, the polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

In an embodiment, the polymers may be linear in character, which may be determined by elution fractionation, wherein non-linear polymers have a CDBI of less than 45%, whereas linear polyethylene types refer to polyethylene having a CDBI of greater than 50%, the CDBI being determined as described in WO 93/03093 (U.S. Pat. No. 5,206,075). In an embodiment, the polymer produced herein has a composition distribution breadth index (CDBI) of 50% or more, or 60% or more, or 70% or more. CDBI is a measure of the composition distribution of monomer within the polymer chains and is measured by the procedure described in WO 93/03093, published Feb. 18, 1993, specifically columns 7 and 8, as well as in Wild et al, J. Poly. Sci., Poly. Phys. Ed., Vol. 20, p. 441, (1982) and U.S. Pat. No. 5,008,204, including that fractions having a weight average molecular weight (Mw) below 15,000 are ignored when determining CDBI.

Polymers described herein may have one or more of the following features:

a) an Mn of at least 200 g/mol, measured by 1H NMR, or 250 g/mol to 100,000 g/mol, e.g., or 200 g/mol to 75,000 g/mol, e.g., or 200 g/mol to 60,000 g/mol, or 300 g/mol to 60,000 g/mol, or 750 g/mol to 30,000 g/mol); and/or b) a Tm, as determined by DSC, of 100° C. or more, or 110° C. or more, or 120° C. or more; and/or c) the polymer comprises at least 50 mol % ethylene, or at least 60 mol %, or at least 70 mol %, or at least 75 mol %, or at least 80 mol %, or at least 85 mol %, or at least 90 mol %, or at least 95 mol %, or essentially 100 mol % ethylene; and/or d) an Mw/Mn of greater than 1 to 4, or greater than 1 to 3.

In an embodiment, polymer produced herein has less than 1400 ppm aluminum, or less than 1200 ppm, or less than 1000 ppm, or less than 500 ppm, or less than 100 ppm as determined by ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, eds., Butterworth-Heinemann, Boston, Mass., 1992, pp. 633-644, which is used herein for purposes of determining the amount of an element in a material; and/or in an embodiment, the polymer has less than 1400 ppm of the Group 3, 4, 5, or 6 transition metal, or of the Group 4 transition metal, or of Ti, Zr, and/or Hf, or less than 1200 ppm, or less than 1000 ppm, or less than 500 ppm, or less than 100 ppm, as determined by ICPES as discussed above.

In an embodiment of the invention, an ethylene polymer according to the instant disclosure has less than 1400 ppm hafnium, or less than 1200 ppm, or less than 1000 ppm, or less than 500 ppm, or less than 100 ppm as determined by ICPES.

In an embodiment of the invention, an ethylene polymer according to the instant disclosure has less than 1400 ppm zirconium, or less than 1200 ppm, or less than 1000 ppm, or less than 500 ppm, or less than 100 ppm as determined by ICPES.

In an embodiment, the polymer produced herein, which may be an ethylene polymer, has a density of greater than 0.95 g/cc, or greater than 0.955 g/cc, or greater than 0.96 g/cc. Density is determined according to ASTM D1505.

$^{13}C$ NMR data were collected at 120° C. in a 10 mm probe using a Varian spectrometer with a $^1$Hydrogen frequency of at least 400 MHz. A 90 degree pulse, an acquisition time adjusted to give a digital resolution between 0.1 and 0.12 Hz, at least a 10 second pulse acquisition delay time with continuous broadband proton decoupling using swept square wave modulation without gating was employed during the entire acquisition period. The spectra were acquired using time averaging to provide a signal to noise level adequate to measure the signals of interest. Samples were dissolved in tetrachloroethane-$d_2$ at concentrations between 10 to 15 wt % prior to being inserted into the spectrometer magnet. Prior to data analysis spectra were referenced by setting the chemical shift of the $(-CH_2-)_n$ signal where n>6 to 29.9 ppm. Chain ends for quantization were identified using the signals shown in the table below. N-butyl and n-propyl were not reported due to their low abundance (less than 5%) relative to the chain ends shown in the table below.

| Chain End | $^{13}$CNMR Chemical Shift |
|---|---|
| P~i-Bu | 23-5 to 25.5 and 25.8 to 26.3 ppm |
| E~i-Bu | 39.5 to 40.2 ppm |
| P~Vinyl | 41.5 to 43 ppm |
| E~Vinyl | 33.9 to 34.4 ppm |

Polymer resonance peaks are referenced to mmmm=21.8 ppm. Calculations involved in the characterization of polymers by NMR are described by F. A. Bovey in Polymer Conformation and Configuration (Academic Press, New York 1969) and J. Randall in Polymer Sequence Determination, $^{13}$C-NMR Method (Academic Press, New York, 1977).

Differential Scanning Calorimetry (DSC)

Crystallization temperature ($T_c$), melting temperature (or melting point, $T_m$), glass transition temperature ($T_g$) and heat of fusion ($H_f$) are measured using Differential Scanning calorimetry (DSC) on a commercially available instrument (e.g., TA Instruments 2920 DSC). Typically, 6 to 10 mg of molded polymer or plasticized polymer are sealed in an aluminum pan and loaded into the instrument at room temperature. Data are acquired by heating the sample to at least 30° C. above its melting temperature, typically 220° C. for polypropylene, at a heating rate of 10° C./min. The sample is held for at least 5 minutes at this temperature to destroy its thermal history. Then the sample is cooled from the melt to at least 50° C. below the crystallization temperature, typically −100° C. for polypropylene, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed according to standard procedures. The melting temperatures (Tm) reported are the peak melting temperatures from the second heat unless otherwise specified. For polymers displaying multiple peaks, the melting temperature is defined to be the peak melting temperature from the melting trace associated with the largest endothermic calorimetric response (as opposed to the peak occurring at the highest temperature). Likewise, the crystallization temperature is defined to be the peak crystallization temperature from the crystallization trace associated with the largest exothermic calorimetric response (as opposed to the peak occurring at the highest temperature).

Areas under the DSC curve are used to determine the heat of transition (heat of fusion, $H_f$, upon melting or heat of crystallization, $H_c$, upon crystallization), which can be used to calculate the degree of crystallinity (also called the percent crystallinity). The percent crystallinity (X %) is calculated using the formula: [area under the curve (in J/g)/H° (in J/g)]*100, where H° is the ideal heat of fusion for a perfect crystal of the homopolymer of the major monomer component. These values for H° are to be obtained from the Polymer Handbook, Fourth Edition, published by John Wiley and Sons, New York 1999, except that a value of 290 J/g is used for H° (polyethylene), a value of 140 J/g is used for H° (polybutene), and a value of 207 J/g is used for H° (polypropylene).

Heat of melting (Hm) is determined using the DSC procedure above except that the sample is cooled to −100° C., held for 5 minutes then heated at 10° C./min to 200° C. Hm is measured on the first melt, not the second melt. The Hm sample must have been aged at least 48 hours at room temperature and should not be heated to destroy thermal history.

Blends

In an embodiment, the polymer (e.g., the polyethylene or polypropylene) produced herein is combined with one or more additional polymers prior to being formed into a film, molded part, or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In an embodiment, the polymer (e.g., the polyethylene or polypropylene) is present in the above blends, at from 10 to 99 wt %, based upon the weight of the polymers in the blend, or 20 to 95 wt %, or at least 30 to 90 wt %, or at least 40 to 90 wt %, or at least 50 to 90 wt %, or at least 60 to 90 wt %, or at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX 1010 or IRGANOX 1076 available from Ciba-Geigy); phosphites (e.g., IRGAFOS 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

In an embodiment, the invention relates to polyolefins comprising ethylene, wherein the polyolefin is produced by a process comprising: contacting one or more olefins with a supported catalyst system as described herein at a temperature, a pressure, and for a period of time sufficient to produce a polyolefin. In some embodiments, the polyolefin comprises at least 50 mol %, e.g., at least 75 mol %, at least 99.9 mol % ethylene, of polymer units derived from ethylene.

Films

In an embodiment, any of the foregoing polymers, such as the foregoing polypropylenes or blends thereof, may be used in a variety of end-use applications. Applications include, for example, mono- or multi-layer blown, extruded, and/or shrink films. These films may be formed by any number of well known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically, the films are oriented in the machine direction (MD) at a ratio of up to 15, or between 5 and 7, and in the transverse direction (TD) at a ratio of up to 15, or 7 to 9. However, in an embodiment, the film is oriented to the same extent in both the MD and TD directions.

The films may vary in thickness depending on the intended application; however, films of a thickness from 1 to 50 μm are usually suitable. Films intended for packaging are usually from 10 to 50 μm thick. The thickness of the sealing layer is typically 0.2 to 50 μm. There may be a sealing layer on both the inner and outer surfaces of the film or the sealing layer may be present on only the inner or the outer surface.

In an embodiment, one or more layers may be modified by corona treatment, electron beam irradiation, gamma irradiation, flame treatment, or microwave. In an embodiment, one or both of the surface layers is modified by corona treatment.

Molded Products

The compositions described herein (or polypropylene compositions) may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

Further, the compositions described herein (or polypropylene compositions) may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. Typically, an extrudate film of the composition of this invention (and any other layers or materials) is placed on a shuttle rack to hold it during heating. The shuttle rack indexes into the oven which pre-heats the film before forming Once the film is heated, the shuttle rack indexes back to the forming tool. The film is then vacuumed onto the forming tool to hold it in place and the forming tool is closed. The tool stays closed to cool the film and the tool is then opened. The shaped laminate is then removed from the tool. The thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution.

Blow molding is another suitable forming means for use with the compositions of this invention, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING, 90-92 (Jacqueline I. Kroschwitz, ed., John Wiley & Sons 1990).

Likewise, molded articles may be fabricated by injecting molten polymer into a mold that shapes and solidifies the molten polymer into desirable geometry and thickness of molded articles. Sheets may be made either by extruding a substantially flat profile from a die, onto a chill roll, or by calendaring. Sheets are generally considered to have a thickness of from 254 μm to 2540 μm (10 mils to 100 mils), although any given sheet may be substantially thicker.

Non-Wovens and Fibers

The polyolefin compositions described above may also be used to prepare nonwoven fabrics and fibers of this invention in any nonwoven fabric and fiber making process, including but not limited to, melt blowing, spinbonding, film aperturing, and staple fiber carding. A continuous filament process may also be used. Or a spunbonding process is used. The spunbonding process is well known in the art. Generally it involves the extrusion of fibers through a spinneret. These fibers are then drawn using high velocity air and laid on an endless belt. A calendar roll is generally then used to heat the web and bond the fibers to one another although other techniques may be used such as sonic bonding and adhesive bonding.

EMBODIMENTS

Accordingly, the instant disclosure relates to the following Embodiments:

Embodiment 1

A catalyst system comprising the reaction product of a fluorided support (such as fluorided silica support) that preferably has not been calcined at a temperature of 400° C. or more, an activator and a catalyst compound of Formula I:

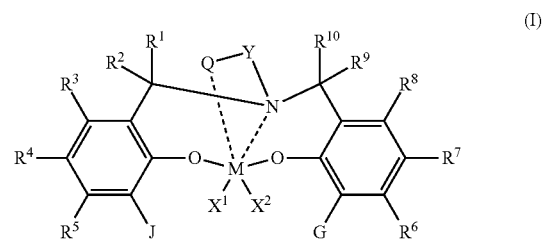

wherein:
M is a Group 4 transition metal;
$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure;

each $R^1$, $R^2$, $R^3$, $R^4$, $R^5$, $R^6$, $R^7$, $R^8$, $R^9$, and $R^{10}$ is, independently, a hydrogen, a $C_1$ to $C_{40}$ hydrocarbyl radical, a $C_1$-$C_{40}$ substituted hydrocarbyl radical, a heteroatom or a heteroatom-containing group, or two or more of $R^1$ to $R^{10}$ may independently join together to form a $C_4$ to $C_{62}$ cyclic or polycyclic ring structure, or a combination thereof;

Q is a neutral donor group;

J is a $C_7$ to $C_{60}$ fused polycyclic group, which optionally comprises up to 20 atoms from Groups 15 and 16, where at least one ring is aromatic and where at least one ring, which may or may not be aromatic, has at least five members;

G is as defined for J or may be hydrogen, a $C_1$ to $C_{60}$ hydrocarbyl radical, a $C_1$ to $C_{60}$ substituted hydrocarbyl radical, a heteroatom or a heteroatom-containing group, or may independently form a $C_4$ to $C_{60}$ cyclic or polycyclic ring structure with $R^6$, $R^7$, or $R^8$ or a combination thereof; and Y is a divalent $C_1$ to $C_{20}$ hydrocarbyl or divalent $C_1$ to $C_{20}$ substituted hydrocarbyl.

Embodiment 2

The catalyst system of Embodiment 1, wherein the fluorided support comprises fluorided silica.

Embodiment 3

The catalyst system of Embodiment 2, wherein the fluorided silica has not been calcined at a temperature of 400° C. or more.

Embodiment 4

The catalyst system of any of Embodiments 1 to 3, wherein the complex is represented by the formula (II) or (III):

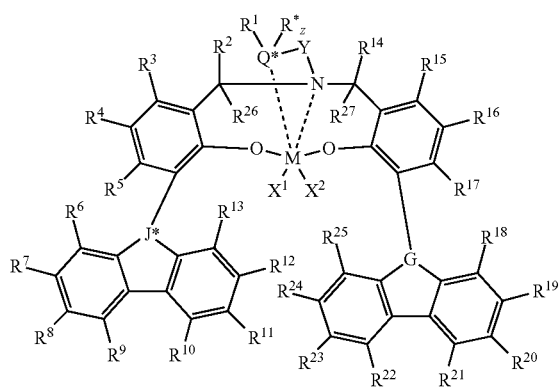

(II)

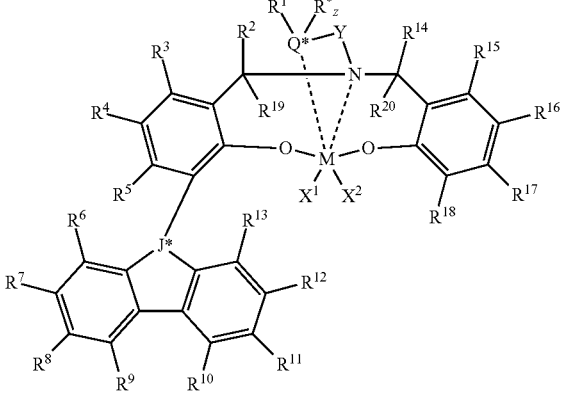

(III)

wherein:

M, $X^1$, $X^2$, $R^1$, $R^2$, $R^3$, $R^4$, $R^5$, $R^6$, $R^7$, $R^8$, $R^9$, $R^{10}$, and Y are as defined in Embodiment 1;

each $R^*$, $R''$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, a hydrogen, a $C_1$ to $C_{40}$ hydrocarbyl radical, a $C_1$ to $C_{40}$ substituted hydrocarbyl radical a functional group comprising elements from Groups 13 to 17 of the periodic table of the elements, or two or more of $R^1$ to $R^{28}$ may independently join together to form a $C_4$ to $C_{62}$ cyclic or polycyclic ring structure, or a combination thereof, or R1 and R* may independently join together to form a five- to eight-membered heterocycle;

Q* is a group 15 or 16 atom;

z is 0 or 1;

J* is CR" or N; and

G* is CR" or N.

Embodiment 5

The catalyst system of Embodiments 1 to 4, wherein M is Hf, Zr, or Ti.

Embodiment 6

The catalyst system of any of Embodiments 1 to 5, wherein G and J or G* and J* are carbazolyl, substituted carbazolyl, indolyl, substituted indolyl, indolinyl, substituted indolinyl, imidazolyl, substituted imidazolyl, indenyl, substituted indenyl, indanyl, substituted indanyl, fluorenyl, or substituted fluorenyl.

Embodiment 7

The catalyst system of any of Embodiments 1 to 6, wherein Q is a neutral donor group comprising at least one atom from Group 15 or Group 16 and the -(-Q-Y-)- fragment can form a substituted or unsubstituted heterocycle which may or may not be aromatic and may have multiple fused rings.

Embodiment 8

The catalyst system of any of Embodiments 1 to 7, wherein Q is $NR'_2$, OR, $SR'$, $PR'_2$, where R is as defined for $R^1$.

Embodiment 9

The catalyst system of any of Embodiments 1 to 8, wherein G and J are the same or G* and J* are the same.

Embodiment 10

The catalyst system of any of Embodiments 1 to 9, wherein J or J* is a hydrogen, a $C_1$ to $C_{60}$ hydrocarbyl radical, a substituted hydrocarbyl radical, a heteroatom, or a heteroatom-containing group, or may independently form a $C_4$ to $C_{60}$ cyclic or polycyclic ring structure with $R^6$, $R^7$, or $R^8$, or a combination thereof.

Embodiment 11

The catalyst system of Embodiment 1, wherein the catalyst complex is represented by formula (IV) or (V):

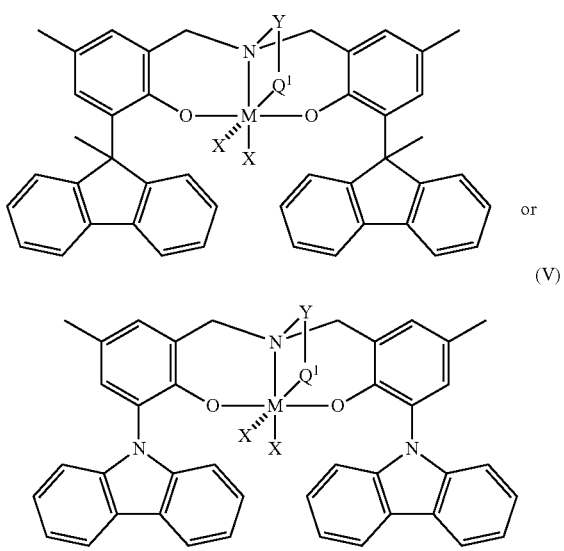

(IV)

or (V)

wherein: Y is a divalent $C_1$ to $C_3$ hydrocarbyl, $Q^1$ is $NR'_2$, OR, SR, $PR'_2$, where R is as defined for $R^1$ in Embodiment 1, M is Zr, Hf, or Ti and each X is, independently, as defined for $X^1$ in Embodiment 1.

Embodiment 12

The catalyst system of Embodiment 4, wherein Q* is N, O, S, or P, and when Q* is N or P, z is 1 and when Q* is S or O, z is 0, and G* and J* are N or CR'', where each R'' is H or a $C_1$ to $C_{12}$ alkyl.

Embodiment 13

The catalyst system of any of Embodiments 1 to 12, wherein the catalyst system further comprises a chain transfer agent.

Embodiment 14

The catalyst system of any of Embodiments 1 to 13, wherein the catalyst system further comprises chain transfer agent represented by the formula $R_3Al$ or $R_2Zn$, where R is a $C_1$ to $C_{20}$ alkyl group.

Embodiment 15

The catalyst system of any of Embodiments 1 to 14, wherein the activator is a non-coordinating anion.

Embodiment 16

The catalyst system of any of Embodiments 1 to 15, wherein the activator comprises an alkylalumoxane.

Embodiment 17

The catalyst system of any of Embodiments 1 to 16, wherein the activator is selected from the group consisting of: methylalumoxane, ethylalumoxane, isobutyl alumoxane, N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetra(perfluorophenyl)borate, triphenylcarbenium tetrakis(perfluorophenyl)borate, 1-(4-(tris(pentafluorophenyl)borate)-2,3,5,6-tetrafluorophenyl)pyrrolidinium, tetrakis(pentafluorophenyl)borate, and 4-(tris(pentafluorophenyeborate)-2,3,5,6-tetrafluoropyridine.

Embodiment 18

A method of preparing a catalyst system according to any of Embodiments 1 to 17, comprising:
combining a fluoride compound with water, then combining with a slurry of a non-polar solvent and a support,
removing the non-polar solvent,
thereafter combining the support with a second solvent, which may be the same as or different from the non-polar solvent, an activator, and at least a first catalyst compound according to Formula I:

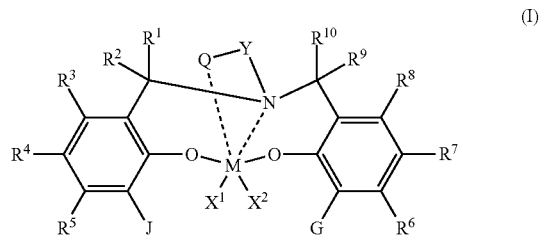

(I)

wherein:
M is a Group 4 transition metal;
$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure;
each $R^1$, $R^2$, $R^3$, $R^4$, $R^5$, $R^6$, $R^7$, $R^8$, $R^9$, and $R^{10}$ is, independently, a hydrogen, a $C_1$ to $C_{40}$ hydrocarbyl radical, a $C_1$-$C_{40}$ substituted hydrocarbyl radical, a heteroatom or a heteroatom-containing group, or two or more of $R^1$ to $R^{10}$ may independently join together to form a $C_4$ to $C_{62}$ cyclic or polycyclic ring structure, or a combination thereof;
Q is a neutral donor group;
J is a $C_7$ to $C_{60}$ fused polycyclic group, which optionally comprises up to 20 atoms from Groups 15 and 16, where at least one ring is aromatic and where at least one ring, which may or may not be aromatic, has at least five members;

G is as defined for J or may be hydrogen, a $C_1$ to $C_{60}$ hydrocarbyl radical, a $C_1$ to $C_{60}$ substituted hydrocarbyl radical, a heteroatom or a heteroatom-containing group, or may independently form a $C_4$ to $C_{60}$ cyclic or polycyclic ring structure with $R^6$, $R^7$, or $R^8$ or a combination thereof; and Y is a divalent $C_1$ to $C_{20}$ hydrocarbyl or divalent $C_1$ to $C_{20}$ substituted hydrocarbyl.

Embodiment 19

The method of Embodiment 18, wherein the support comprises silica.

Embodiment 20

The method of Embodiment 18 or 19, wherein the fluorided support is calcined at a temperature from 100 to less than 400° C., before or after combination with the activator and/or catalyst compounds.

Embodiment 21

The method of any of Embodiments 18 to 20, wherein the ratio (by weight) of water to non-polar solvent is between 1:10 to 1:1000.

Embodiment 22

The method of any of Embodiments 18 to 21, wherein the non-polar solvent is toluene, pentane, hexane, benzene, or chloroform.

Embodiment 23

The method of any of Embodiments 18 to 22, wherein the fluoride compound is one or more of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$, and $NH_4HF_2$.

Embodiment 24

The method of any of Embodiments 18 to 23, wherein the fluoride compound comprises ammonium hexafluorosilicate, ammonium tetrafluoroborate, or a mixture thereof.

Embodiment 25

The method of any of Embodiments 18 to 24, further comprising spray drying the catalyst system.

Embodiment 26

A polymerization process to produce polyolefin comprising:
a) contacting one or more olefin monomers with the catalyst system of any of Embodiments 1 to 18, or a catalyst system produced by the method of any of Embodiments 18-25, and
b) obtaining olefin polymer.

Embodiment 27

The process of Embodiment 26, wherein the activator is an alumoxane or a non-coordinating anion.

Embodiment 28

The process of Embodiment 26 or 27, wherein the activator is selected from the group consisting of: methylalumoxane, ethylalumoxane, isobutyl alumoxane, N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetra(perfluorophenyl)borate, triphenylcarbenium tetrakis(perfluorophenyl)borate, 1-(4-(tris(pentafluorophenyl)borate)-2,3,5,6-tetrafluorophenyl)pyrrolidinium, tetrakis(pentafluorophenyl)borate, and 4-(tris(pentafluorophenyeborate)-2,3,5,6-tetrafluoropyridine.

Embodiment 29

The process of any of Embodiments 26 to 28, wherein the monomer comprises ethylene.

Embodiment 30

The process of any of Embodiments 26 to 28, wherein the monomer comprises propylene.

Embodiment 31

The process of any of Embodiments 26 to 28, wherein contacting one or more olefin monomers with the catalyst system includes contacting one or more olefin monomers with a chain transfer agent.

Embodiment 32

The process of Embodiment 31, wherein the chain transfer agent represented by the formula $R_3Al$ or $R_2Zn$ is present at a molar ratio of transition metal to Al and Zn of at least 10:1, where R is a $C_1$ to $C_{40}$ alkyl group.

Embodiment 33

The process of Embodiment 31, wherein the chain transfer agent represented by the formula $R_3Al$ and the chain transfer agent represented by the formula $R_2Zn$ are present at a molar ratio of transition metal to Al and Zn of at least 100:1, where R is a $C_1$ to $C_{20}$ alkyl group.

Embodiment 34

The process of any of Embodiments 26 to 33, wherein the process is a continuous process.

Embodiment 35

The process of any of Embodiments 26 to 34, wherein step a) occurs at a temperature of at least 120° C.

Embodiment 36

The process of Embodiment 35, wherein step a) occurs at a temperature of at least 130° C.

Embodiment 37

The process of any of Embodiments 26 to 36, wherein contacting one or more olefin monomers with the catalyst system includes contacting one or more olefin monomers with the catalyst system in the presence of hydrogen.

Embodiment 38

The process of any of Embodiments 26 to 37, wherein contacting one or more olefin monomers with the catalyst system includes contacting one or more olefin monomers with the catalyst system in the presence of hydrogen and a chain transfer agent.

EXPERIMENTAL

Examples

Melt index (MI) also referred to as $I_2$, reported in g/10 min, is determined according to ASTM D1238, 190° C., 2.16 kg load.

High load melt index (HLMI) also referred to as $I_{21}$, reported in g/10 min, is determined according to ASTM D1238, 190° C., 21.6 kg load.

Melt index ratio (MIR) is MI divided by HLMI as determined by ASTM D1238.

Density is determined according to ASTM D1505.

Bulk Density is measured according to ASTM D1895.

Mw, Mn, and Mz, may be determined by Rapid GPC and percent of 1-hexene incorporation may be determined by FT-IR. To determine various molecular weight related values by GPC, high temperature size exclusion chromatography is performed using an automated "Rapid GPC" system as generally described in U.S. Pat. No. 6,491,816; U.S. Pat. No. 6,491,823; U.S. Pat. No. 6,475,391; U.S. Pat. No. 6,461,515; U.S. Pat. No. 6,436,292; U.S. Pat. No. 6,406,632; U.S. Pat. No. 6,175,409; U.S. Pat. No. 6,454,947; U.S. Pat. No. 6,260,407; and U.S. Pat. No. 6,294,388; each of which is fully incorporated herein by reference for US purposes. This apparatus has a series of three 30 cm*7.5 mm linear columns, each containing PLgel 10 μm, Mix B. The GPC system is calibrated using polystyrene standards ranging from 580-3,390,000 g/mol. The system is operated at an eluent flow rate of 2.0 mL/minutes and an oven temperature of 165° C. 1,2,4-trichlorobenzene was used as the eluent. The polymer samples are dissolved in 1,2,4-trichlorobenzene at a concentration of 0.1-0.9 mg/mL. 250 uL of a polymer solution is injected into the system. The concentration of the polymer in the eluent is monitored using an evaporative light scattering detector. The molecular weights presented are relative to linear polystyrene standards and are uncorrected.

The foregoing discussion can be further described with reference to the following non-limiting examples. Twelve illustrative catalyst compounds (A-L), each according to one or more embodiments described, were synthesized and some were used to polymerize olefins. All reactions were carried out under a purified nitrogen atmosphere using standard glovebox, high vacuum or Schlenk techniques, unless otherwise noted. All solvents used were anhydrous, de-oxygenated and purified according to known procedures. All starting materials were either purchased from Aldrich and purified prior to use or prepared according to procedures known to those skilled in the art.

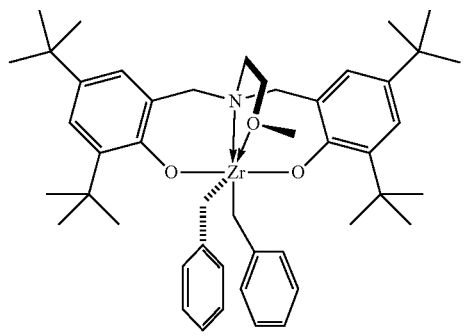

Compound A

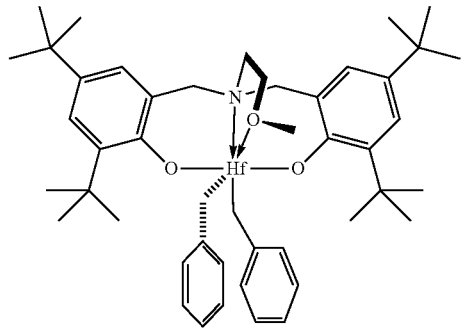

Compound B

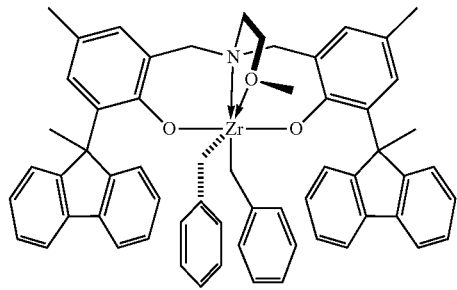

Compound C

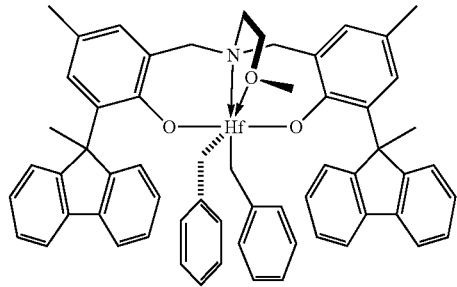

Compound D

Compound E

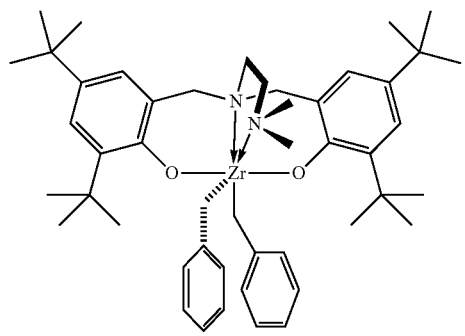

Compound F

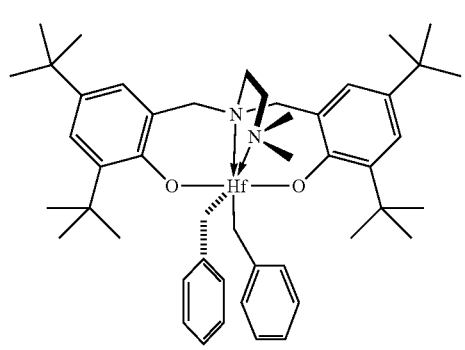

Compound G

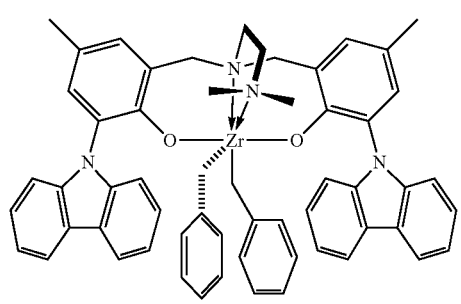

Compound H

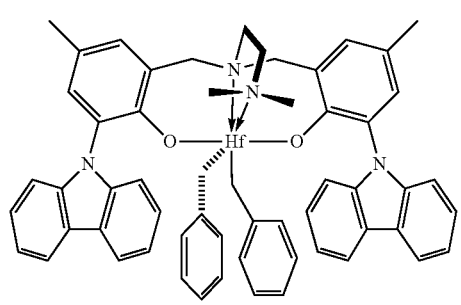

Compound I

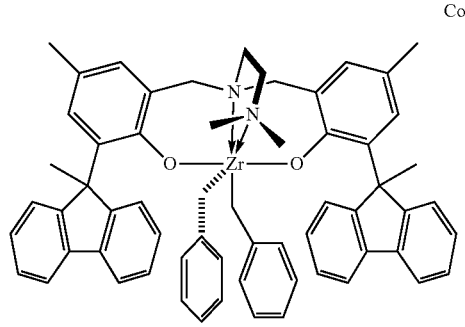

Compound J

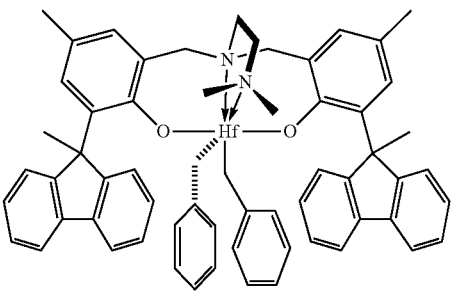

Compound K

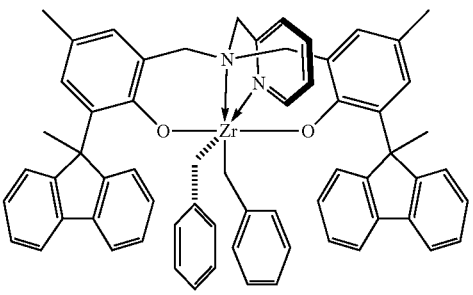

Compound L

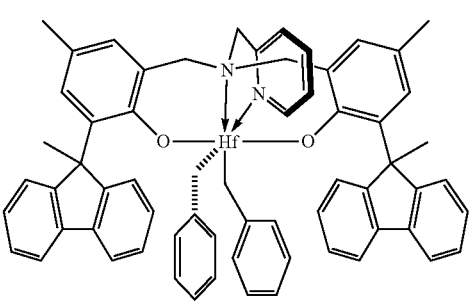

Examples 1 and 2. Compound A and Compound B

Compounds A and B of Examples 1 and 2 are prepared as described in Tshuva, E. Y.; Groysman, S.; Goldberg, I.; Kol, M. "[ONXO]-Type Amine Bis(phenolate) Zirconium and Hafnium Complexes as Extremely Active 1-Hexene Polymerization Catalysts." Organometallics, 2002, 21(4), p. 662-670, which is incorporated by reference herein (hereafter referred to as "Tshuva, et al.").

Examples 3 and 4. Compound C and Compound D

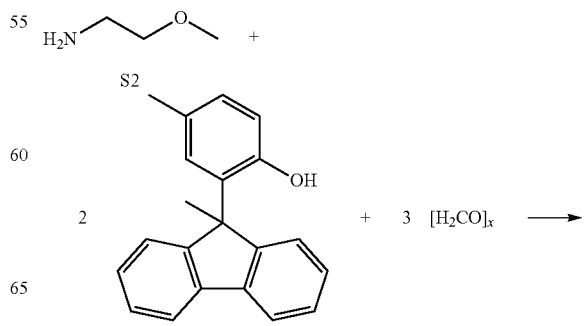

47
-continued

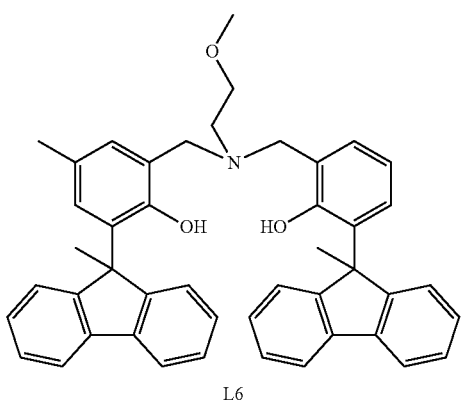

L6

2-(((2-hydroxy-3-(9-methyl-9H-fluoren-9-yl)benzyl)(2-methoxyethyl)amino)methyl)-4-methyl-6-(9-methyl-9H-fluoren-9-yl)phenol (L6)

A 50 mL round bottom flask was charged with S2 (0.696 g, 2.43 mmol, 2 eq), paraformaldehyde (0.116 g, 3.86 mmol, 3 eq), 2-methoxyethanamine (0.091 g, 1.21 mmol, 1 eq), 0.6 mL water and 3 mL methanol. The resulting white suspension was stirred at 80° C. overnight then cooled to room temperature. The supernatant was decanted, and the crude product was purified over a Biotage silica column using a gradient of 0-30% ethyl acetate in hexane, which yielded L6 (0.262 g, 32%) as a white powder.

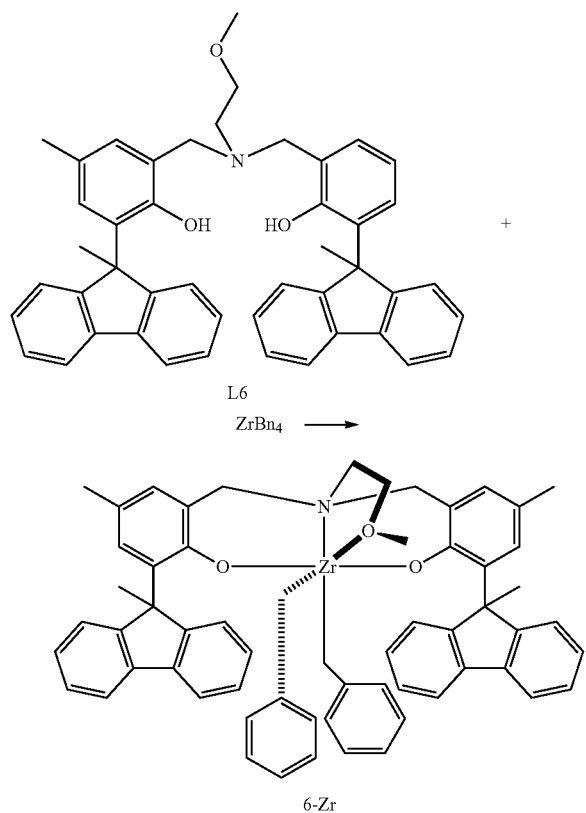

48

2-methoxy-N,N-bis[methylene(4-methyl-2-(9-methyl-9H-fluoren-9-yl)phenolate)]ethanamine zirconium(IV) dibenzyl (6-Zr)

In a glovebox, a 20 mL vial was charged with L6 (0.262 g, 0.373 mmol, 1 eq), $ZrBn_4$ (0.1704 g, 0.3739 mmol, 1 eq), and 3 mL toluene. The resulting orange solution was stirred at 60° C. for 3 h then cooled to room temperature. The volatiles were removed from the mixture under nitrogen flow, and the resulting residue was recrystallized in 2 mL pentane at −35° C. Removal of the supernatant followed by drying under reduced pressure yielded 6-Zr (0.3566 g, quantitative) as a pale yellow powder. $^1$H NMR (400 MHz, $CD_2Cl_2$)—broad and overlapping resonances; δ=7.87, 7.79, 7.77, 7.51, 7.43, 7.34, 7.28, 7.18, 6.84, 6.66, 6.61, 3.19, 3.07, 2.83, 2.80, 2.46, 2.00.

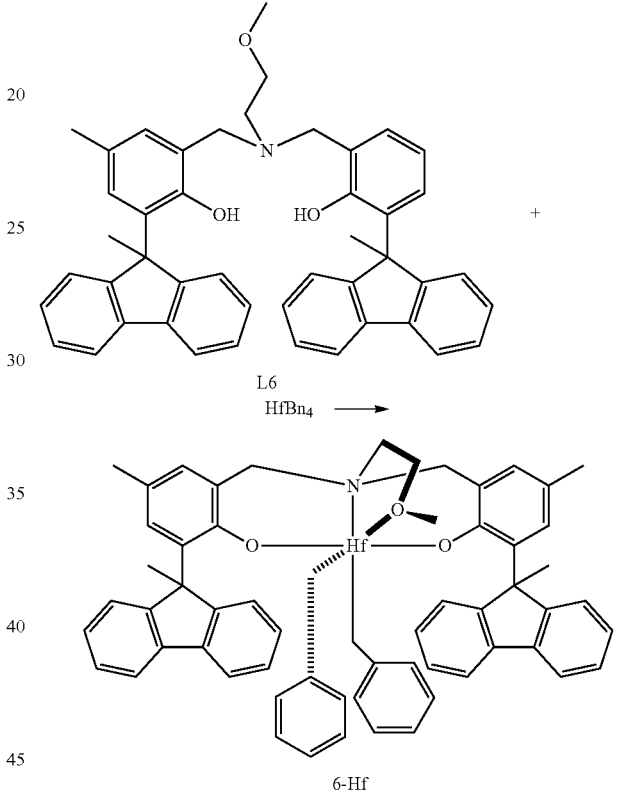

2-methoxy-N,N-bis[methylene(4-methyl-2-(9-methyl-9H-fluoren-9-yl)phenolate)]ethanamine hafnium(IV) dibenzyl (6-Hf)

In a glovebox, a 20 mL vial was charged with L6 (0.201 g, 0.299 mmol, 1 eq), $HfBn_4$ (0.1614 g, 0.2972 mmol, 1 eq), and 3 mL toluene. The resulting pale yellow solution was stirred at 60° C. for 2.5 h then cooled to room temperature. The volatiles were removed from the mixture under nitrogen flow, and the resulting residue was recrystallized in 2 mL pentane at −35° C. Removal of the supernatant followed by drying under reduced pressure yielded 6-Hf (0.2958 g, quantitative) as a white powder. $^1$H NMR (400 MHz, $CD_2Cl_2$)— broad and overlapping resonances; δ=7.84, 7.76, 7.48, 7.34, 7.26, 7.18, 6.89, 6.81, 6.64, 6.59, 6.53, 3.26, 3.09, 2.87, 2.83, 2.44, 1.90.

Examples 5 and 6. Compound E and Compound F

Compounds E and F of Examples 5 and 6 are prepared as described in Tshuva, et al.

Examples 7 and 8. Compound G and Compound H

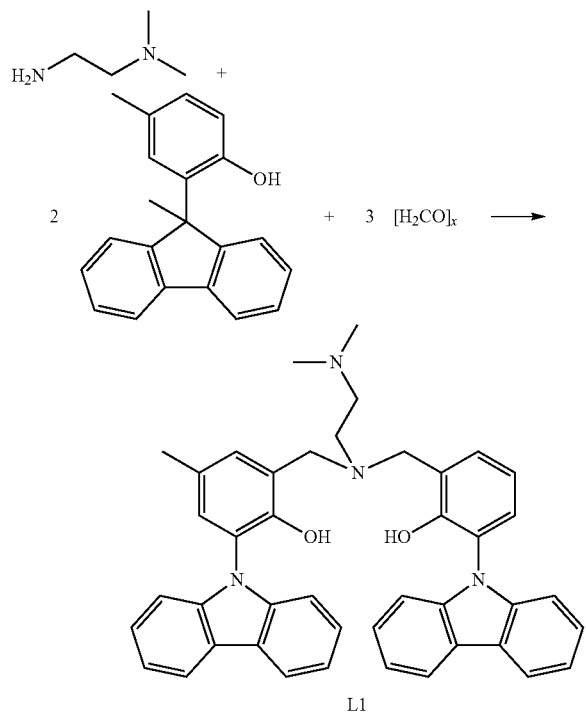

L1

2-(((3-(9H-carbazol-9-yl)-2-hydroxybenzyl)(2-(dimethylamino)ethyl)amino)methyl)-6-(9H-carbazol-9-yl)-4-methylphenol (L1)

A 100 mL round-bottom flask was charged with 2-(9H-carbazol-9-yl)-4-methylphenol (1.004 g, 3.67 mmol, 2 eq), paraformaldehyde (0.164 g, 5.46 mmol, 3 eq), 2-dimethylaminoethanamine (0.162 g, 1.84 mmol, 1 eq) and ethanol (50 mL). The resulting white suspension was stirred at 90° C. for 3 days then cooled to room temperature. Precipitated solids were collected, washed with cold ethanol (2×10 mL), and dried under reduced pressure yielding L1 (0.378 g, 31% yield) as a white powder.

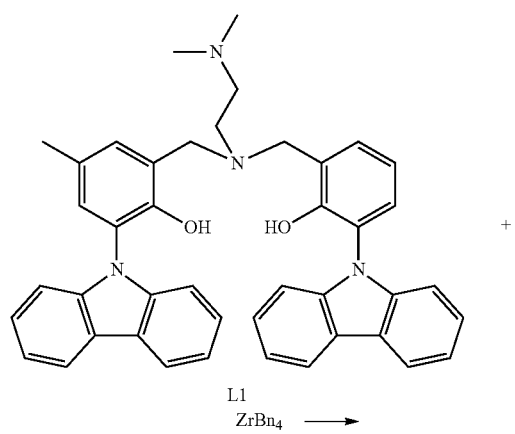

L1
ZrBn4 ⟶

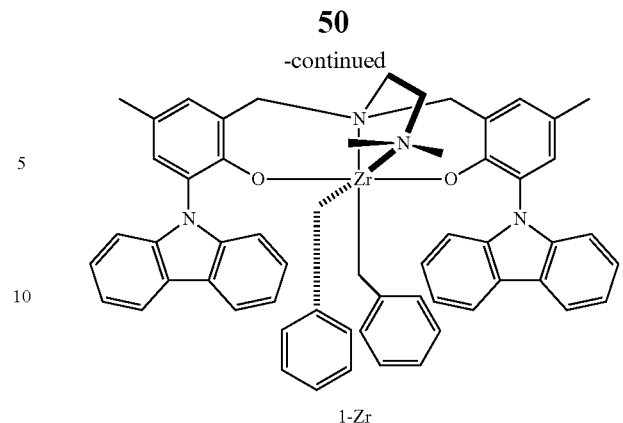

1-Zr 2-dimethylamino-N,N-bis[methylene(4-methyl-2-carbazolylphenolate)]ethanamine zirconium(IV) dibenzyl (1-Zr)

In a glovebox, a 20 mL vial was charged with L1 (0.0788 g, 0.120 mmol, 1 eq), ZrBn4 (0.0550 g, 0.121 mmol, 1 eq) and toluene (2 mL). The resulting yellow solution was stirred at 60° C. for 3.5 hours during which yellow solids precipitated out. The volatiles were removed from the mixture under $N_2$ flow, and the residue was recrystallized in 1:4 toluene:pentane (1 mL) at −35° C. Removal of the supernatant followed by drying under reduced pressure yielded 1-Zr·0.8toluene (0.1052 g, 87%) as a yellow powder. $^1$H NMR (400 MHz, $C_6D_6$) δ=8.08 (d, 2H), 8.05 (d, 2H), 7.56 (d, 2H), 7.51 (t, 2H), 7.31 (t, 2H), 6.92-7.27 (13H), 7.86 (t, 2H), 6.78 (t, 1H), 6.68 (d, 2H), 5.23 (d, 2H), 4.00 (d, 2H), 2.63 (d, 2H), 2.10 (s, 6H), 1.98 (m, 2H), 1.27 (m, 2H), 1.22 (s, 2H), 1.08 (s, 2H), 0.89 (s, 6H).

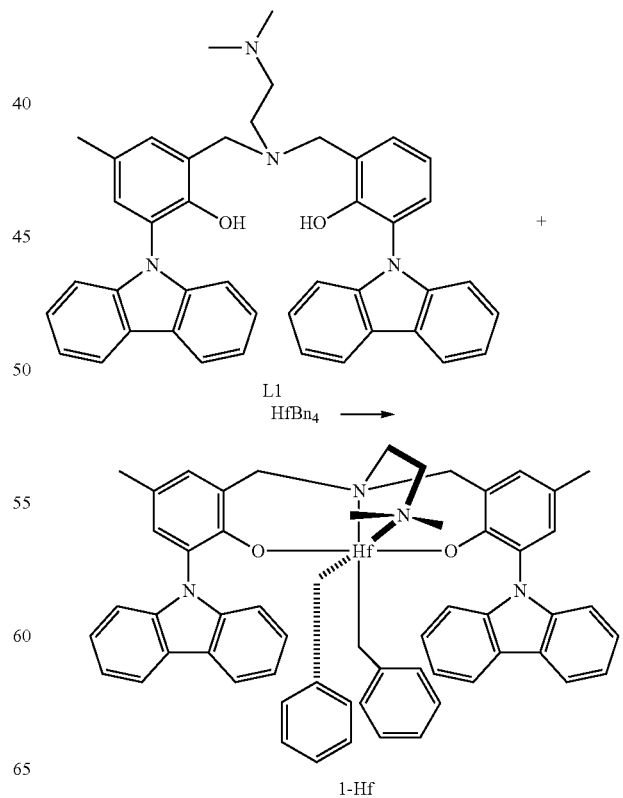

L1
HfBn4 ⟶

1-Hf

2-dimethylamino-N,N-bis[methylene(4-methyl-2-carbazolylphenolate)]ethanamine hafnium(IV) dibenzyl (1-Hf)

This compound was prepared following the procedure for A-Zr using L1 (0.0732 g 0.111 mmol, 1 eq), HfBn₄ (0.0610 g, 0.112 mmol, 1 eq) and toluene (2 mL), which yielded 1-Hf.0.7 toluene (0.0970 g, 81%) as a white powder. ¹H NMR (400 MHz, C₆D₆) δ=8.13 (dd, 2H), 8.10 (dd, 2H), 7.72 (d, 2H), 7.53 (t, 2H), 7.35 (t, 2H), 6.98-7.28 (13H), 6.82 (t, 2H), 6.73 (t, 1H), 6.65 (d, 2H), 5.36 (d, 2H), 3.87 (d, 2H), 2.60 (d, 2H), 2.12 (s, 6H), 1.90 (s, 2H), 1.81 (br, 2H), 1.15 (br, 2H), 0.90 (s, 2H), 0.68 (s, 6H).

Examples 9 and 10. Compound I and Compound J

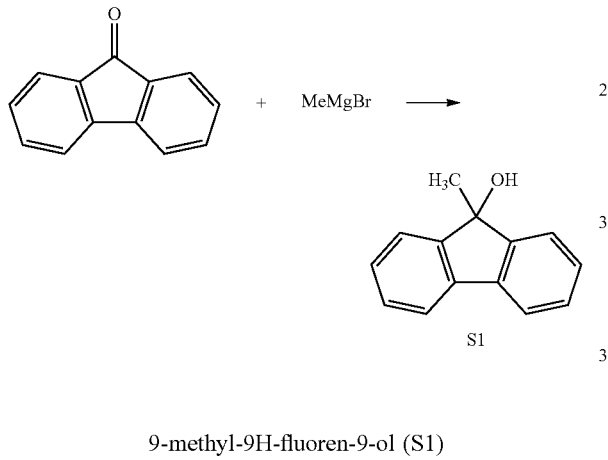

9-methyl-9H-fluoren-9-ol (S1)

In a glovebox, a 250 mL round-bottom flask was charged with 9H-fluoren-9-one (10.300 g, 57.2 mmol, 1.0 eq) and THF (80 mL), and the resulting solution was cooled to 0° C. MeMgBr (20.0 mL of a 3.0 M solution, 0.6 mmol, 1.05 eq) was then slowly added using a syringe to the stirring solution, which turned into a slurry at the end of the addition. The mixture was warmed to room temperature and allowed to stir for 16 hours. The reaction vessel was then removed from the glovebox, and the reaction mixture was poured into a saturated solution of NH₄Cl (200 mL) and washed with brine (100 mL×2). The organic portion was collected, dried over MgSO₄, filtered and concentrated under a nitrogen stream. The crude product was recrystallized in pentane (200 mL) yielding S1 (10.077 g, 90%) as a white powder. Alternatively, L5a can be purified on a Biotage™ silica column with a gradient of 5-20% ethyl acetate in hexane.

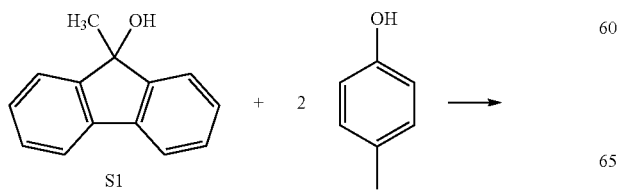

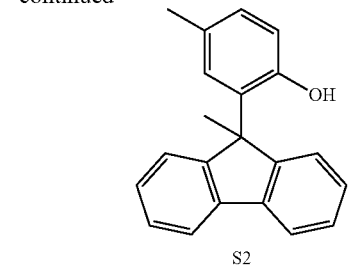

4-methyl-2-(9-methyl-9H-fluoren-9-yl)phenol (S1)

In a 500 mL round-bottom flask, p-cresol (7.8 g, 72 mmol, 2 eq) was dissolved in DCM (200 mL) followed by slow addition of concentrated sulfuric acid (3.916 g, 37.93 mmol, 1 eq). A solution of S1 (7.403 g, 37.72 mmol, 1 eq) in DCM (150 mL) was then added to the flask using an addition funnel, and the resulting yellow solution was stirred for 3 hours at room temperature during which the color turned green. The reaction was basified with 2M NaOH to pH 9-10. The organic layer was collected, washed with brine, dried with MgSO₄ and concentrated under a nitrogen stream. The crude product was purified over a Biotage™ silica column using a gradient of 5-20% DCM in hexane, which yielded S2 (8.437 g, 78%) as a white crystalline powder.

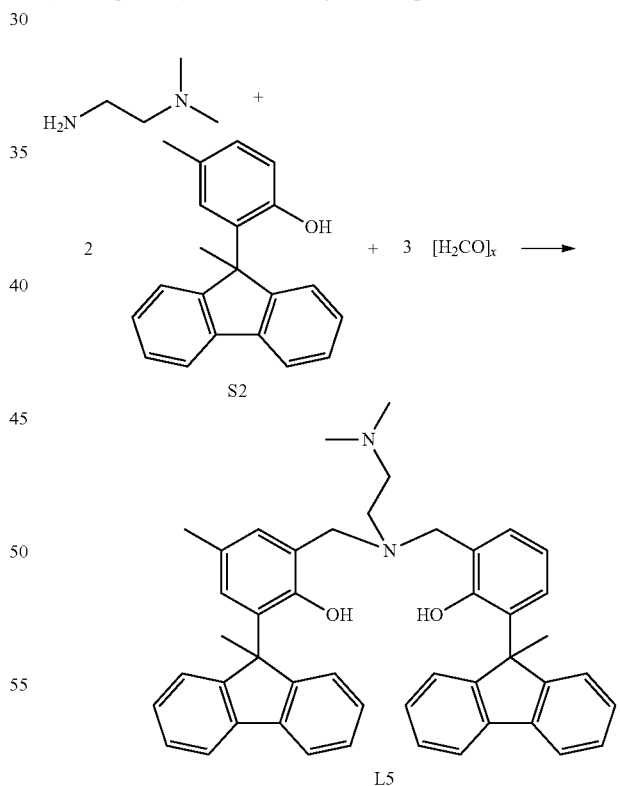

2-(((2-(dimethylamino)ethyl)(2-hydroxy-3-(9-methyl-9H-fluoren-9-yl)benzyl)amino)methyl)-4-methyl-6-(9-methyl-9H-fluoren-9-yl)phenol (L5)

A 50 mL round-bottom flask was charged with S2 (0.755 g, 2.64 mmol, 2 eq), paraformaldehyde (0.109 g, 3.63 mmol, 3 eq), LiCl (0.122 g, 2.88 mmol, 2 eq), 2-dimethylaminoethanamine (0.117 g, 1.33 mmol, 1 eq) and ethanol (4 mL). The resulting white slurry was stirred at 80° C. for 3 days then cooled to room temperature. The supernatant was decanted, and the crude product was purified over silica gel, eluting with a gradient of 0-20% ethyl acetate in hexane, to give L5 (0.696 g, 77%) as a white powder.

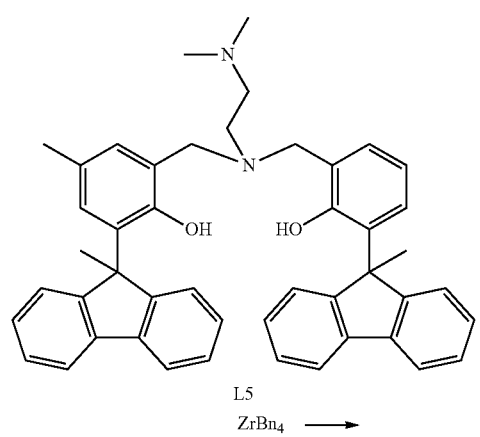

L5
ZrBn4 ⟶

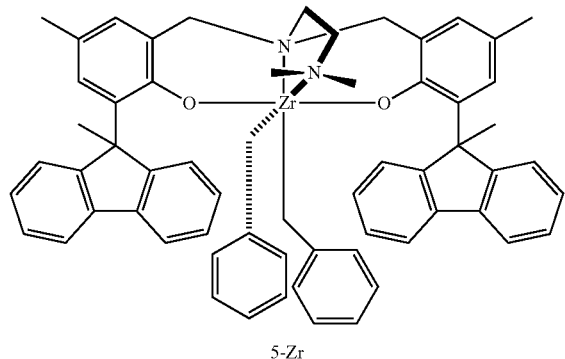

5-Zr 2-dimethylamino-N,N-bis[methylene(4-methyl-2-(9-methyl-9H-fluoren-9-yl)phenolate)]ethanamine zirconium(IV) dibenzyl (5-Zr)

In a glovebox, a 20 mL vial was charged with L5 (0.1708 g, 0.2494 mmol, 1 eq), ZrBn4 (0.1130 g, 0.2480 mmol, 1 eq), and 3 mL toluene. The resulting orange solution was stirred at 60° C. for 3 h then cooled to room temperature. The volatiles were removed from the mixture under nitrogen flow, and the resulting residue was recrystallized in 2 mL pentane at −35° C. Removal of the supernatant followed by drying under reduced pressure yielded 5-Zr (0.2304 g, 97%) as a pale yellow powder. $^1$H NMR (400 MHz, CD$_2$Cl$_2$)—broad and overlapping resonances; δ=8.37, 7.77, 7.42, 7.32, 7.24, 7.18, 6.81, 6.65, 6.55, 3.13, 2.73, 2.38, 1.91.

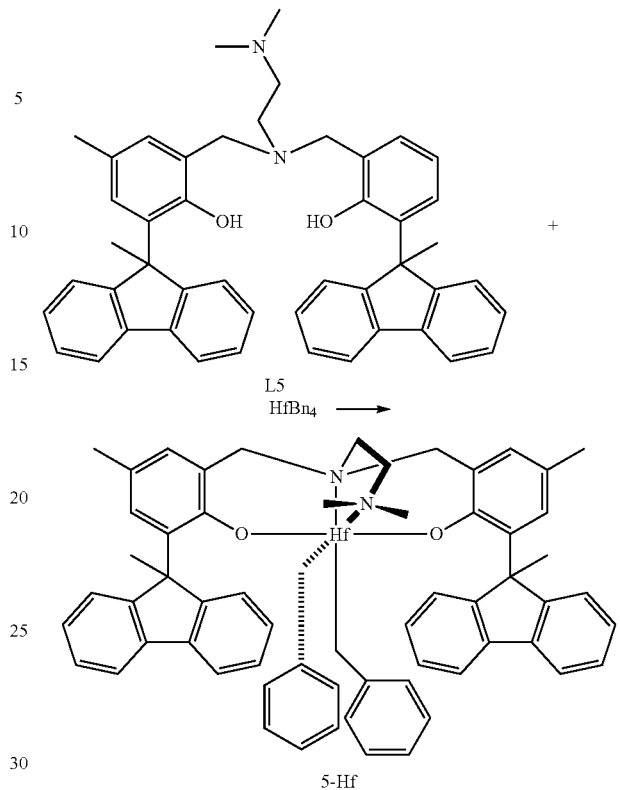

2-dimethylamino-N,N-bis[methylene(4-methyl-2-(9-methyl-9H-fluoren-9-yl)phenolate)]ethanamine hafnium(IV) dibenzyl (5-Hf)

In a glovebox, a 20 mL vial was charged with L5 (0.1867 g, 0.2726 mmol, 1 eq), HfBn4 (0.1508 g, 0.2777 mmol, 1 eq), and 3 mL toluene. The resulting yellow solution was stirred at 60° C. for 2 h then cooled to room temperature. The volatiles were removed from the mixture under nitrogen flow, and the resulting residue was recrystallized in 1 mL pentane at −35° C. Removal of the supernatant followed by drying under reduced pressure yielded 5-Hf (0.2756 g, 92%) as a very light tan powder. $^1$H NMR (400 MHz, CD$_2$Cl$_2$)—broad and overlapping resonances; δ=8.31, 7.81, 7.43, 7.32, 7.24, 7.22, 7.18, 7.16, 6.85, 6.83, 6.65, 6.54, 3.25, 3.09, 2.78, 3.42, 2.23, 2.08, 1.86, 1.73, 1.49.

Examples 11 and 12. Compound K and Compound L

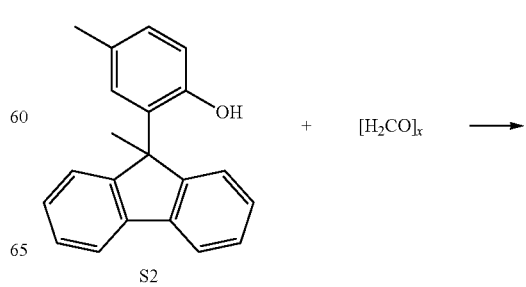

S2

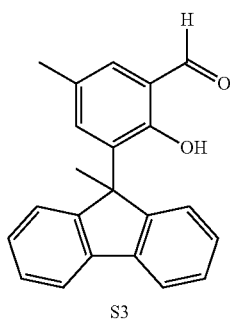

2-hydroxy-5-methyl-3-(9-methyl-9H-fluoren-9-yl)benzaldehyde (S3)

In a glovebox, S2 (5.346 g, 18.7 mmol, 1.0 eq), paraformaldehyde (3.364 g, 112.0 mmol, 6 eq), Et$_3$N (5.667 g, 56.0 mmol, 3 eq), and MgCl$_2$ (4.443 g, 46.5 mmol, 2.5 eq) were slurried in 150 mL of CH$_3$CN and stirred for 2 hours upon which the slurry became yellow. The reaction flask was then cooled to −35° C. and DMF (6.822 g, 93.3 mmol, 5 eq) was added. The reaction was allowed to warm to room temp and stirred for 16 hours. The reaction flask was removed from the glovebox and the contents poured into 250 mL of 1M HCl, where the yellow slurry immediately turned white. The slurry was extracted with EtOAc (200 mL). The organics were washed with brine (100 mL×2), collected, dried with MgSO$_4$, filtered through a frit and concentrated. The resulting residue was purified on a silica column using a 0-20% EtOAc/Hexane gradient to yield S3 (4.85 g, 82%).

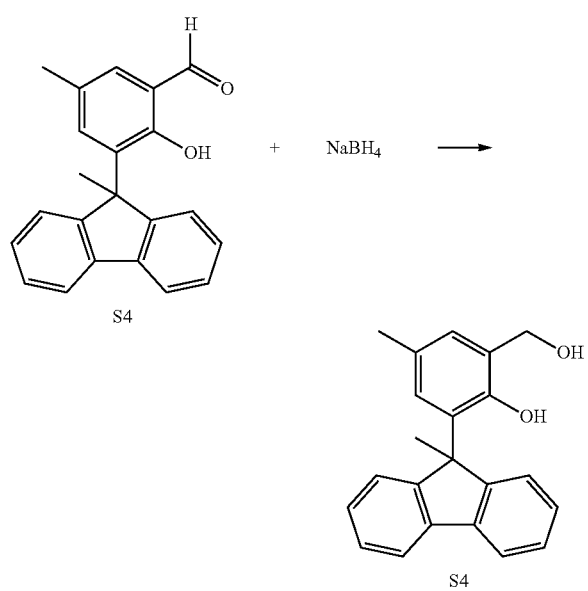

2-(hydroxymethyl)-4-methyl-6-(9-methyl-9H-fluoren-9-yl)phenol (S4)

In a 250 mL round bottom flask, S3 (4.711 g, 15.0 mmol, 1.0 eq) was dissolved in 80 mL of MeOH. NaBH$_4$ (1.134, 30.0 mmol, 2 eq) was added slowly as a powder. Vigorous bubbling was observed along with a change to an almost colorless solution. Reaction was allowed to stir for 16 hours. Solvent was removed and the residue was extracted with CH$_2$Cl$_2$ (100 mL). The organics were washed with water (50 mL×2) and brine (50 mL×2). The organics were then collected, dried with MgSO$_4$, filtered through a frit, and the solvent removed to give a white solid. The crude product was purified on a silica column with a 0-2% MeOH/CH$_2$Cl$_2$ gradient to give S4 (3.638 g, 77%).

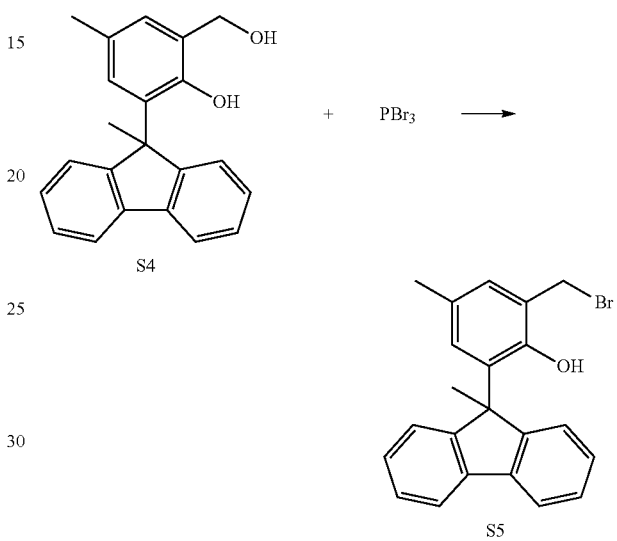

2-(bromomethyl)-4-methyl-6-(9-methyl-9H-fluoren-9-yl)phenol (S5)

In a glovebox, S4 (2.123 g, 6.71 mmol, 1 eq) was dissolved in 40 mL of CH$_2$Cl$_2$. Separately, PBr$_3$ (0.908 g, 3.35 mmol, 0.5 eq) was dissolved in 10 mL of CH$_2$Cl$_2$ then added to a stirring solution of S4. After one hour, the reaction flask was removed from the glovebox and cold water (20 mL) was added to quench the reaction. The organics were separated, dried with MgSO$_4$, filtered through a frit, and concentrated to yield S5 (2.257 g, 88.7%). No further purification was performed.

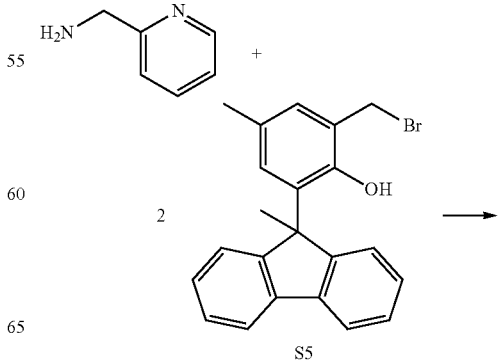

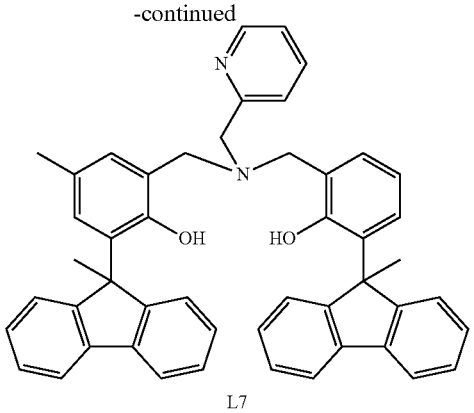

2-(((2-hydroxy-3-(9-methyl-9H-fluoren-9-yl)benzyl) (pyridin-2-ylmethyl)amino)methyl)-4-methyl-6-(9-methyl-9H-fluoren-9-yl)phenol (L7)

In a 20 mL vial, S5 (0.383 g, 1.01 mmol, 2 eq) and 2-picolylamine (0.052 mL, 0.50 mmol, 1 eq) were dissolved in 10 mL of THF. An immediate precipitate was observed. Et₃N was added (0.141, 1.21 mmol, 1.2 eq), and the reaction was stirred for 2 hours. The solvent was removed, and the residue was extracted with Et₂O. The extract was washed with water (5 mL×2) and brine (5 mL), collected, dried with MgSO₄, filtered, and concentrated. The resulting residue was purified using two different solvent gradients through a silica column: a) 40-60% $CH_2Cl_2$/hexane collecting the main fraction, then b) 5-20% EtOAc/Hexane. The yield of the purified product, L7, was 0.126 g (18%).

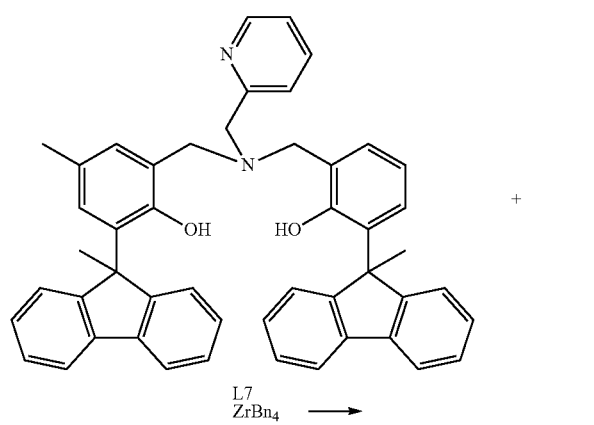

6,6'-(((pyridin-2-ylmethyl)azanediyl)bis(methylene)) bis(4-methyl-2-(9-methyl-9H-fluoren-9-yl)phenolate) zirconium(IV) dibenzyl (7-Zr)

In a glovebox, a 20 mL vial was charged with L7 (0.126 g, 0.179 mmol, 1 eq), ZrBn₄ (0.081 g, 0.179 mmol, 1 eq), and 10 mL toluene. The resulting orange solution was stirred at 50° C. for 1 h then cooled to room temperature. The volatiles were removed from the mixture under nitrogen flow, and the resulting residue was recrystallized in 2 mL pentane at −35° C. Removal of the supernatant followed by drying under reduced pressure yielded 7-Zr (0.139 g, 79%) as a yellow powder. ¹H NMR (400 MHz, $CD_2Cl_2$)— broad and overlapping resonances; δ=7.77, 7.49, 7.32, 7.24, 7.22, 7.18, 7.16, 7.14, 6.94, 6.84, 6.67, 6.57, 3.57, 2.90, 2.87, 1.96.

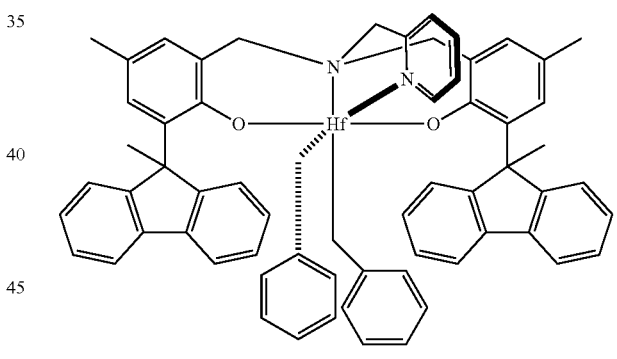

6,6'-(((pyridin-2-ylmethyl)azanediyl)bis(methylene)) bis(4-methyl-2-(9-methyl-9H-fluoren-9-yl)phenolate) hafnium(IV) dibenzyl (6-Hf)

In a glovebox, a 20 mL vial was charged with L7 (0.082 g, 0.116 mmol, 1 eq), HfBn₄ (0.063 g, 0.116 mmol, 1 eq), and 10 mL toluene. The resulting pale yellow solution was stirred at 50° C. for 1 h then cooled to room temperature. The volatiles were removed from the mixture under nitrogen flow, and the resulting residue was recrystallized in 2 mL pentane at −35° C. Removal of the supernatant followed by drying under reduced pressure yielded 7-Hf (0.065 g, 53%) as a white powder. ¹H NMR (400 MHz, $CD_2Cl_2$)— broad and overlapping resonances; δ=7.78, 7.54, 7.33, 7.24, 7.18, 7.16, 6.93, 6.91, 6.65, 3.64, 2.96, 2.93, 1.92.

Preparation of Supports
Silica Support (sMAO):
Silica (D948, 40.7 g) is calcined at 600° C. then slurried in 200 mL of toluene. MAO (71.4 g of a 30 wt % toluene solution, 351.1 mmol of Al) is added slowly to the slurry. The slurry is then heated to 80° C. and stirred for 1 hr. The slurry is filtered, washed three times with 70 mL of toluene and once with pentane. The solid is dried under vacuum overnight to give a 60.7 g amount of free flowing white solid.

Fluorided Silica Support (F-sMAO):
1.18 g $(NH_4)_2SiF_6$ is dissolved in 7.00 g water in a 20 ml glass vial. 50 g silica (Grace D948) and 200 g of toluene are combined. Under vigorous stirring, the aqueous solution of $(NH_4)_2SiF_6$ is added via a syringe to the toluene slurry. The mixture is allowed to stir at room temperature for 2.5 h. The milky slurry is filtered through a 500 mL Optichem disposable polyethylene frit (40 micron), rinsed with 200 g pentane for three times, then dried in air overnight to yield a white, free-flowing solid. The solid is transferred into a tube furnace, and is heated to 200° C. under constant nitrogen flow (temperature program: 25° C./h ramped to 150° C.; held at 150° C. for 4 hours; 50° C./h ramped to 200° C.; held at 200° C. for 4 hours; cooled down to room temperature). 46 g of fluorided silica is collected after the calcination. Calculated F-loading: 0.8 mmol/g (F-loading=mmol of F/gram of added raw silica).

MAO (37.6 g of 30% wt in toluene) is added to a 250 mL celstir along with 100 mL of toluene. 29.9 g fluorided silica prepared in the previous step is added to the slurry in 5 g increments. The reaction stirred for 10 minutes at room temperature and is then heated to 100° C. for 3 hours. The solid is filtered, washed twice with 80 mL of toluene, washed twice with pentane, and dried under vacuum overnight. 39.6 g of free flowing white solid is collected.

Preparation of Supported Catalyst
Procedure I (Preparation of Supported Catalyst)
21.3 mg Compound G (19 µmol) is dissolved in 1.0 g of toluene in a 20 mL glass vial. 0.986 g sMAO (3.2.1a) is slurried in 3.0 g of toluene in a 20 mL glass vial. The Compound G/toluene solution is added to the sMAO slurry via a pipette. The glass vial is capped with a Teflon-lined cap and vortexed at room temperature for 90 min. The resulting slurry is filtered through a 18 mL polyethylene frit (10 micron), and rinsed with 3 g toluene for 3 times, followed by 2 g of pentane for 3 times. The collected solid is dried under vacuum for 40 min 0.968 g of supported Compound G is collected. Calculated catalyst loading: 19 µmol/g (catalyst loading=µmol of catalyst/gram of added sMAO).

Procedure II (Preparation of Fluorided-sMAO)
32.2 mg catalyst Compound G (28 µmol) is combined with 0.71 g F-sMAO (3.2.1b) in a 20 ml glass vial. 4.0 g toluene solution is added to the glass vial. The glass vial is capped with a Teflon-lined cap and vortexed at room temperature for 90 min. The resulting slurry is filtered through a 18 mL polyethylene frit (10 micron), and rinsed with 3 g toluene for 3 times, followed by 2 g of pentane for 3 times. The collected solid is dried under vacuum for 40 min 0.74 g of supported Compound G is collected. Calculated catalyst loading: 40 µmol/g (Catalyst loading=µmol of catalyst/gram of added sMAO).

Ethylene/1-Hexene Copolymerization.
Preparation of catalyst slurry for high throughput run: In a dry box, 45 mg of supported catalyst is weighed into a 20 ml glass vial. 15 ml of toluene is added to the vial to make a slurry that contained 3 mg supported catalyst/ml slurry. The resulting mixture is vortexed prior to injection.

Starting material preparations: Solvents, polymerization grade toluene and isohexane are supplied by ExxonMobil Chemical Company and thoroughly dried and degassed prior to use. Polymerization grade ethylene is used and further purified by passing it through a series of columns: 500 cc Oxyclear cylinder from Labclear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company. TnOAl (tri-n-octylaluminum, neat) is used as a 2 mmol/L solution in toluene.

Reactor Description and Preparation
Polymerizations are conducted in an inert atmosphere ($N_2$) drybox using autoclaves equipped with an external heater for temperature control, glass inserts (internal volume of reactor=22.5 mL), septum inlets, regulated supply of nitrogen, ethylene, and hexene, and equipped with disposable PEEK mechanical stirrers (800 RPM). The autoclave reactors are prepared by purging with dry nitrogen prior to use.

Examples 1-12: Ethylene/1-Hexene Copolymerization

The reactor is prepared as described above, and then purged with ethylene. Isohexane, 1-hexene, and TnOAl are added via syringe at room temperature and atmospheric pressure. The reactor is then brought to process temperature (85° C.) and charged with ethylene to process pressure (130 psig=896 kPa) while stirring at 800 RPM. The transition metal compound "TMC" (100 µL of a 3 mg/mL toluene slurry, unless indicated otherwise) is added via syringe with the reactor at process conditions. TnOAl is used as 200 µL of a 20 mmol/L in isohexane solution. Amounts of reagents not specified above are given in Table 1. No other reagent is used. Ethylene is allowed to enter (through the use of computer controlled solenoid valves) the autoclaves during polymerization to maintain reactor gauge pressure (+/−2 psig). Reactor temperature is monitored and typically maintained within +/−1° C. Polymerizations are halted by addition of approximately 50 psi $O_2$/Ar (5 mol % $O_2$) gas mixture to the autoclaves for approximately 30 seconds. The polymerizations are quenched after a predetermined cumulative amount of ethylene had been added or for a maximum of 45 minutes polymerization time. In addition to the quench time for each run, the reactors are cooled and vented. The polymer is isolated after the solvent is removed in-vacuo. Yields reported include total weight of polymer and residual catalyst. Catalyst activity is reported as kilograms of polymer per mmol transition metal compound per hour of reaction time (kg/mmol·hr).

TABLE 1

| Ex. | Catalyst | Support | Catalyst Loading (μmol/g) | Activity (kg/mol * h) | Mw/1000 (g/mol) | Mw/Mn | wt % hexene |
|---|---|---|---|---|---|---|---|
| 1 | Compound A | F-sMAO | 41 | 2553 | 685 | 5.3 | 3.4 |
| 2 | Compound B | F-sMAO | 40 | 370 | | | |
| 3 | Compound C | F-sMAO | 39 | 8790 | 2647 | 1.8 | 5.5 |
| 4 | Compound D | F-sMAO | 40 | 19829 | 2135 | 2.5 | 2.9 |
| 5 | Compound E | F-sMAO | 40 | 4487 | 1002 | 2.7 | 2.8 |
| 6 | Compound F | F-sMAO | 40 | 1215 | 764 | 5.1 | 3.3 |
| 7 | Compound G | F-sMAO | 39 | 91219 | 1367 | 2.5 | 3.3 |
| 8 | Compound H | F-sMAO | 40 | 47861 | 3119 | 2.2 | 3.4 |
| 9 | Compound I | F-sMAO | 40 | 56825 | 2432 | 2.0 | 3.2 |
| 10 | Compound J | F-sMAO | 40 | 41190 | 2374 | 3.0 | 3.4 |
| 11 | Compound K | F-sMAO | 41 | 29124 | 1141 | 2.4 | 1.2 |
| 12 | Compound L | F-sMAO | 41 | 3129 | 1887 | 2.9 | 0.9 |

Run condition: isohexane as solvent, 85° C., 130 psi ethylene pressure, 30 μl (6 mol % in feed) 1-hexene, no hydrogen added.

Examples 13-20: Effect of Hydrogen Concentration

The supported catalysts are evaluated by high throughput polymerizations in slurry ethylene/1-hexene polymerization tests to determine the effect of hydrogen pressure on molecular weight of resulting polyethylene polymer. For experiments with 0 ppm added hydrogen, ethylene gas is used as the feed. For experiments with 300 ppm added hydrogen, pre-mixed custom gas that contains 300 ppm $H_2$ in ethylene is used as feed. Results for these experiments are recorded in Table 2.

TABLE 2

| Ex. | Catalyst | Added $H_2$ (ppm) | Activity (kg/mol * h) | Mw/1000 (g/mol) | MWD | wt % Hexene |
|---|---|---|---|---|---|---|
| 13 | Compound G | 0 | 91219 | 1367 | 2.5 | 3.3 |
| 14 | Compound G | 300 | 122375 | 1050 | 2.3 | 2.8 |
| 15 | Compound H | 0 | 47861 | 3119 | 2.2 | 3.4 |
| 16 | Compound H | 300 | 57103 | 2578 | 2.2 | 2.9 |
| 17 | Compound I | 0 | 56825 | 2432 | 2.0 | 3.2 |
| 18 | Compound I | 300 | 37794 | 767 | 3.0 | 2.4 |
| 19 | Compound J | 0 | 41190 | 2374 | 3.0 | 3.4 |
| 20 | Compound J | 300 | 29614 | 1177 | 3.3 | 2.1 |

Run condition: isohexane as solvent, 85° C., 130 psi ethylene pressure, 30 μl (6 mol % in feed) 1-hexene.

All documents described herein are incorporated by reference herein, including any priority documents and/or testing procedures to the extent they are not inconsistent with this text As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or is preceding the recitation of the composition, element or elements, and vice versa.

What is claimed is:

1. A catalyst system comprising the reaction product of a fluorided support, an activator and a catalyst compound of Formula I:

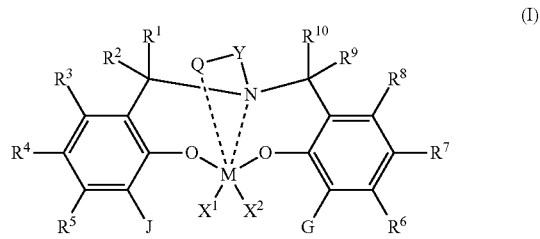

wherein:

M is a Group 4 transition metal;

$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure;

each $R^1$, $R^2$, $R^3$, $R^4$, $R^5$, $R^6$, $R^7$, $R^8$, $R^9$, and $R^{10}$ is, independently, a hydrogen, a $C_1$ to $C_{40}$ hydrocarbyl radical, a $C_1$-$C_{40}$ substituted hydrocarbyl radical, a heteroatom or a heteroatom-containing group, or two or more of $R^1$ to $R^{10}$ may independently join together to form a $C_4$ to $C_{62}$ cyclic or polycyclic ring structure;

Q is a neutral donor group;

J is a $C_7$ to $C_{60}$ fused polycyclic group, which optionally comprises up to 20 atoms from Groups 15 and 16, where at least one ring is aromatic and where at least one ring, which may or may not be aromatic, has at least five members;

G is as defined for J or may be hydrogen, a $C_1$-$C_{60}$ hydrocarbyl radical, a $C_1$-$C_{60}$ substituted hydrocarbyl radical, a heteroatom or a heteroatom-containing group, or may independently form a $C_4$ to $C_{60}$ cyclic or polycyclic ring structure with $R^6$, $R^7$, or $R^8$; and Y is a divalent $C_1$ to $C_{20}$ hydrocarbylene or divalent $C_1$ to $C_{20}$ substituted hydrocarbylene.

2. The catalyst system of claim 1, wherein the fluorided support comprises fluorided silica.

3. The catalyst system of claim 2, wherein the fluorided silica has not been calcined at a temperature of 400° C. or more.

4. The catalyst system of claim 1, wherein G and J are carbazolyl, substituted carbazolyl, indolyl, substituted indolyl, indolinyl, substituted indolinyl, imidazolyl, substituted imidazolyl, indenyl, substituted indenyl, indanyl, substituted indanyl, fluorenyl, or substituted fluorenyl and Q is a neutral donor group comprising at least one atom from Group 15 or Group 16 and the -(-Q-Y-)- fragment can form a substituted or unsubstituted heterocycle which may or may not be aromatic and may have multiple fused rings.

5. The catalyst system of claim 1, wherein G is a $C_1$ to $C_{60}$ hydrocarbyl radical, a substituted hydrocarbyl radical, a heteroatom, or a heteroatom-containing group, or may independently form a $C_4$ to $C_{60}$ cyclic or polycyclic ring structure with $R^6$, $R^7$, or $R^8$.

6. The catalyst system of claim 1, wherein the catalyst complex is represented by formula (IV) or (V):

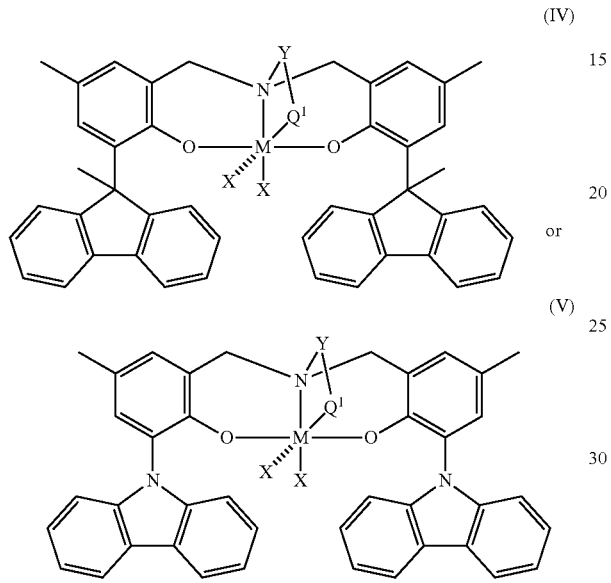

where Y is a divalent $C_1$ to $C_3$ hydrocarbylene, $Q^1$ is $NR'_2$, $OR'$, $SR'$, $PR'_2$, where M is Zr, Hf, or Ti each X is, independently, a univalent $C_1$ to $C_{20}$ hydrocarbyl radical, a $C_1$ to $C_{20}$ substituted hydrocarbyl radical, a heteroatom or a heteroatom-containing group, or both X groups join together to form a $C_4$ to $C_{62}$ cyclic or polycyclic ring structure;

each R' is, independently, a hydrogen, a $C_1$ to $C_{40}$ hydrocarbyl radical, a $C_1$-$C_{40}$ substituted hydrocarbyl radical, a heteroatom or a heteroatom-containing group, or two or more of R' may independently join together to form a $C_4$ to $C_{62}$ cyclic or polycyclic ring structure.

7. The catalyst system of claim 1, wherein the catalyst system further comprises a chain transfer agent.

8. The catalyst system of claim 1, wherein the catalyst system further comprises chain transfer agent represented by the formula $R_3Al$ or $R_2Zn$, where R is a $C_1$ to $C_{20}$ alkyl group.

9. The catalyst system of claim 1, wherein the activator comprises an alkylalumoxane.

10. The catalyst system of claim 1, wherein the activator is selected from the group consisting of: methylalumoxane, ethylalumoxane, isobutyl alumoxane, N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, 1-(4-(tris(pentafluorophenyl)borate)-2,3,5,6-tetrafluorophenyl)pyrrolidinium, and 4-(tris(pentafluorophenyl)borate)-2,3,5,6-tetrafluoropyridine.

11. The catalyst system of claim 1, wherein G and J are carbazolyl, substituted carbazolyl, indolyl, substituted indolyl, indolinyl, substituted indolinyl, imidazolyl, substituted imidazolyl, indenyl, substituted indenyl, indanyl, substituted indanyl, fluorenyl, or substituted fluorenyl and Q is $NR'_2$, $OR'$, $SR'$, $PR'_2$, where each R' is, independently, a hydrogen, a $C_1$ to $C_{40}$ hydrocarbyl radical, a $C_1$-$C_{40}$ substituted hydrocarbyl radical, a heteroatom or a heteroatom-containing group.

12. A method of preparing a catalyst system according to claim 1, comprising:
  combining a fluoride compound with water, then combining with a slurry of a non-polar solvent and a support,
  removing the non-polar solvent,
  thereafter combining the support with a second solvent, which may be the same as or different from the non-polar solvent, an activator, and at least a first catalyst compound according to Formula I:

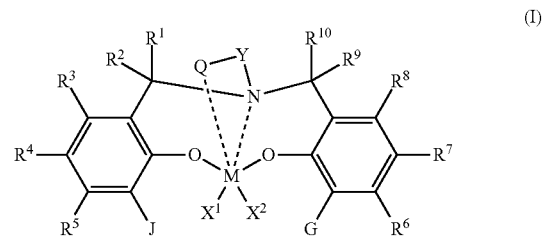

wherein:
M is a Group 4 transition metal;
$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure;
each $R^1$, $R^2$, $R^3$, $R^4$, $R^5$, $R^6$, $R^7$, $R^8$, $R^9$, and $R^{10}$ is, independently, a hydrogen, a $C_1$ to $C_{40}$ hydrocarbyl radical, a $C_1$-$C_{40}$ substituted hydrocarbyl radical, a heteroatom or a heteroatom-containing group, or two or more of $R^1$ to $R^{10}$ may independently join together to form a $C_4$ to $C_{62}$ cyclic or polycyclic ring structure;
Q is a neutral donor group;
J is a $C_7$ to $C_{60}$ fused polycyclic group, which optionally comprises up to 20 atoms from Groups 15 and 16, where at least one ring is aromatic and where at least one ring, which may or may not be aromatic, has at least five members;
G is as defined for J or may be hydrogen, a $C_1$ to $C_{60}$ hydrocarbyl radical, a $C_1$ to $C_{60}$ substituted hydrocarbyl radical, a heteroatom or a heteroatom-containing group, or may independently form a $C_4$ to $C_{60}$ cyclic or polycyclic ring structure with $R^6$, $R^7$, or $R^8$; and
Y is a divalent $C_1$ to $C_{20}$ hydrocarbylene or divalent $C_1$ to $C_{20}$ substituted hydrocarbylene.

13. The method of claim 12, wherein the support comprises silica.

14. The method of claim 12, wherein the support is calcined at a temperature from 100° to less than 400° C., before or after combination with the activator and/or catalyst compounds.

15. The method of claim 12, wherein a ratio (by weight) of water to non-polar solvent is between 1:10 to 1:1000.

16. The method of claim 12, wherein the non-polar solvent is toluene, pentane, hexane, or benzene.

17. The method of claim 12, wherein the fluoride compound is one or more of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, HF, $BF_3$, $NHF_2$, or $NH_4HF_2$.

18. The method of claim 12, wherein the fluoride compound comprises ammonium hexafluorosilicate, ammonium tetrafluoroborate, or a mixture thereof.

19. The method of claim 12, further comprising spray drying the catalyst system.

20. A method of preparing a catalyst system according to claim 1, comprising:
combining a fluoride compound with water, then combining with a slurry of chloroform and a support;
removing the chloroform;
thereafter combining the support with a second solvent, which may be the same as or different from the chloroform, an activator, and at least a first catalyst compound according to Formula I:

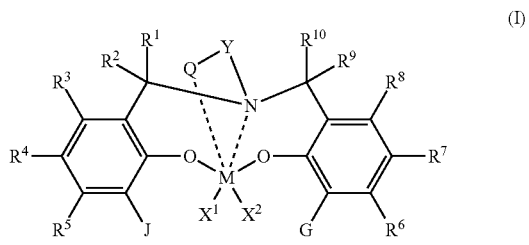

(I)

wherein:
M is a Group 4 transition metal;
$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure;
each $R^1$, $R^2$, $R^3$, $R^4$, $R^5$, $R^6$, $R^7$, $R^8$, $R^9$, and $R^{10}$ is, independently, a hydrogen, a $C_1$ to $C_{40}$ hydrocarbyl radical, a $C_1$-$C_{40}$ substituted hydrocarbyl radical, a heteroatom or a heteroatom-containing group, or two or more of $R^1$ to $R^{10}$ may independently join together to form a $C_4$ to $C_{62}$ cyclic or polycyclic ring structure;
Q is a neutral donor group;
J is a $C_7$ to $C_{60}$ fused polycyclic group, which optionally comprises up to 20 atoms from Groups 15 and 16, where at least one ring is aromatic and where at least one ring, which may or may not be aromatic, has at least five members;
G is as defined for J or may be hydrogen, a $C_1$ to $C_{60}$ hydrocarbyl radical, a $C_1$ to $C_{60}$ substituted hydrocarbyl radical, a heteroatom or a heteroatom-containing group, or may independently form a $C_4$ to $C_{60}$ cyclic or polycyclic ring structure with $R^6$, $R^7$, or $R^8$; and
Y is a divalent $C_1$ to $C_{20}$ hydrocarbylene or divalent $C_1$ to $C_{20}$ substituted hydrocarbylene.

21. A polymerization process to produce polyolefin comprising:
a) contacting one or more olefin monomers with the catalyst system of claim 1, and
b) obtaining olefin polymer.

22. The process of claim 21, wherein the activator is an alumoxane or a non-coordinating anion.

23. The process of claim 22, wherein the activator is selected from the group consisting of: methylalumoxane, ethylalumoxane, isobutyl alumoxane, N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, 1-(4-(tris(pentafluorophenyl)borate)-2,3,5,6-tetrafluorophenyl)pyrrolidinium, and 4-(tris(pentafluorophenyl)borate)-2,3,5,6-tetrafluoropyridine.

24. The process of claim 21, wherein contacting one or more olefin monomers with the catalyst system includes contacting one or more olefin monomers with a chain transfer agent.

25. The process of claim 24, wherein the chain transfer agent is represented by the formula $R_3Al$, $R_2Zn$, or $R_3Al$ and $R_2Zn$ and is present at a molar ratio of transition metal to Al, Zn, or Al and Zn, respectively, of at least 10:1, where R is a $C_1$ to $C_{40}$ alkyl group.

26. The process of claim 24, wherein the chain transfer agent is represented by the formula $R_3Al$, $R_2Zn$, or $R_3Al$ and $R_2Zn$ and is present at a molar ratio of transition metal to Al, Zn, or Al and Zn, respectively, of at least 100:1, where R is a $C_1$ to $C_{40}$ alkyl group.

27. A catalyst system comprising the reaction product of a fluorided support, an activator and a catalyst compound: represented by the formula (II) or (III):

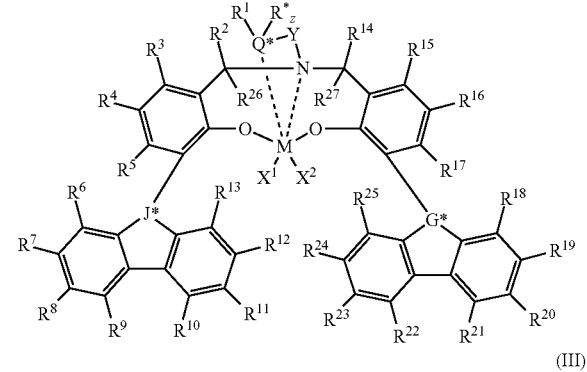

(II)

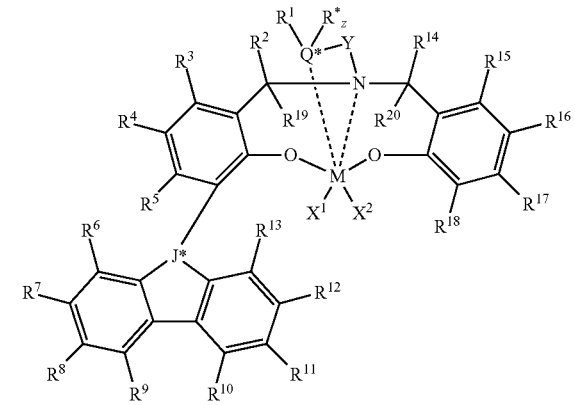

(III)

wherein:
M is a Group 4 transition metal;
$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure;

each $R^1$, $R^2$, $R^3$, $R^4$, $R^5$, $R^6$, $R^7$, $R^8$, $R^9$, and $R^{10}$ is, independently, a hydrogen, a $C_1$ to $C_{40}$ hydrocarbyl radical, a $C_1$-$C_{40}$ substituted hydrocarbyl radical, a heteroatom or a heteroatom-containing group, or two or more of $R^1$ to $R^{10}$ may independently join together to form a $C_4$ to $C_{62}$ cyclic or polycyclic ring structure;

Y is a divalent $C_1$ to $C_{20}$ hydrocarbylene or divalent $C_1$ to $C_{20}$ substituted hydrocarbylene;

each $R^*$, $R''$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, a hydrogen, a $C_1$ to $C_{40}$ hydrocarbyl radical, a $C_1$ to $C_{40}$ substituted hydrocarbyl radical, a functional group comprising elements from Groups 13 to 17 of the periodic table of the elements, or two or more of $R^1$ to $R^{27}$ may independently join together to form a $C_4$ to $C_{62}$ cyclic or polycyclic ring structure, or $R^1$ and $R^*$ may independently join together to form a five- to eight-membered heterocycle;

$Q^*$ is a group 15 or 16 atom;

z is 0 or 1;

$J^*$ is $CR'''$ or N; and $G^*$ is $CR'''$ or N.

28. The catalyst system of claim 27, wherein $Q^*$ is N, O, S, or P, and when $Q^*$ is N or P, z is 1 and when $Q^*$ is S or O, z is 0, and $G^*$ and $J^*$ are N or $CR'''$, where each $R'''$ is H or a $C_1$ to $C_{12}$ alkyl.

29. A polymerization process to produce polyolefin comprising:
 a) contacting one or more olefin monomers with the catalyst system of claim 2, and
 b) obtaining olefin polymer.

30. A polymerization process to produce polyolefin comprising:
 a) contacting one or more olefin monomers with the catalyst system of claim 3, and
 b) obtaining olefin polymer.

31. A polymerization process to produce polyolefin comprising:
 a) contacting one or more olefin monomers with the catalyst system of claim 27, and
 b) obtaining olefin polymer.

32. A polymerization process to produce polyolefin comprising:
 a) contacting one or more olefin monomers with the catalyst system of claim 4, and
 b) obtaining olefin polymer.

33. A polymerization process to produce polyolefin comprising:
 a) contacting one or more olefin monomers with the catalyst system of claim 5, and
 b) obtaining olefin polymer.

34. A polymerization process to produce polyolefin comprising:
 a) contacting one or more olefin monomers with the catalyst system of claim 6, and
 b) obtaining olefin polymer.

35. A polymerization process to produce polyolefin comprising:
 a) contacting one or more olefin monomers with the catalyst system of claim 28, and
 b) obtaining olefin polymer.

36. A polymerization process to produce polyolefin comprising:
 a) contacting one or more olefin monomers with the catalyst system of claim 7, and
 b) obtaining olefin polymer.

37. A polymerization process to produce polyolefin comprising:
 a) contacting one or more olefin monomers with the catalyst system of claim 8, and
 b) obtaining olefin polymer.

38. A polymerization process to produce polyolefin comprising:
 a) contacting one or more olefin monomers with the catalyst system of claim 9, and
 b) obtaining olefin polymer.

39. A polymerization process to produce polyolefin comprising:
 a) contacting one or more olefin monomers with the catalyst system of claim 12, and
 b) obtaining olefin polymer.

40. The process of claim 2, wherein the activator is selected from the group consisting of: methylalumoxane, ethylalumoxane, isobutyl alumoxane, N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, 1-(4-(tris(pentafluorophenyl)borate)-2,3,5,6-tetrafluorophenyl)pyrrolidinium, and 4-(tris(pentafluorophenyl)borate)-2,3,5,6-tetrafluoropyridine.

41. The process of claim 27, wherein the activator is selected from the group consisting of: methylalumoxane, ethylalumoxane, isobutyl alumoxane, N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, 1-(4-(tris(pentafluorophenyl)borate)-2,3,5,6-tetrafluorophenyl)pyrrolidinium, and 4-(tris(pentafluorophenyl)borate)-2,3,5,6-tetrafluoropyridine.

42. The process of claim 6, wherein the activator is selected from the group consisting of: methylalumoxane, ethylalumoxane, isobutyl alumoxane, N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, 1-(4-(tris(pentafluorophenyl)borate)-2,3,5,6-tetrafluorophenyl)pyrrolidinium, and 4-(tris(pentafluorophenyl)borate)-2,3,5,6-tetrafluoropyridine.

43. The process of claim 2, wherein contacting one or more olefin monomers with the catalyst system includes contacting one or more olefin monomers with a chain transfer agent and the chain transfer agent is represented by the formula $R_3Al$, $R_2Zn$, or $R_3Al$ and $R_2Zn$ and is present at a molar ratio of transition metal to Al, Zn, or Al and Zn, respectively, of at least 10:1, where R is a $C_1$ to $C_{40}$ alkyl group.

44. The process of claim 27, wherein contacting one or more olefin monomers with the catalyst system includes contacting one or more olefin monomers with a chain transfer agent and the chain transfer agent is represented by the formula $R_3Al$, $R_2Zn$, or $R_3Al$ and $R_2Zn$ and is present at a molar ratio of transition metal to Al, Zn, or Al and Zn, respectively, of at least 10:1, where R is a $C_1$ to $C_{40}$ alkyl group.

45. The process of claim 6, wherein contacting one or more olefin monomers with the catalyst system includes contacting one or more olefin monomers with a chain transfer agent and the chain transfer agent is represented by the formula $R_3Al$, $R_2Zn$, or $R_3Al$ and $R_2Zn$ and is present at a molar ratio of transition metal to Al, Zn, or Al and Zn, respectively, of at least 10:1, where R is a $C_1$ to $C_{40}$ alkyl group.

* * * * *